(12) United States Patent
Kang et al.

(10) Patent No.: US 12,270,597 B2
(45) Date of Patent: Apr. 8, 2025

(54) REFRIGERATOR AND HOME APPLIANCE

(71) Applicant: LG Electronics Inc., Seoul (KR)

(72) Inventors: Heekyung Kang, Seoul (KR); Daekee Shin, Seoul (KR); Kyoungjoung Kim, Seoul (KR); Misun Park, Seoul (KR); Kiwan Nahm, Seoul (KR); Yongbeom Ma, Seoul (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 18/082,367

(22) Filed: Dec. 15, 2022

(65) Prior Publication Data
US 2023/0194155 A1 Jun. 22, 2023

(30) Foreign Application Priority Data

Dec. 17, 2021 (KR) ........................ 10-2021-0181182

(51) Int. Cl.
| | | |
|---|---|---|
| *F25D 27/00* | (2006.01) | |
| *F25D 23/02* | (2006.01) | |
| *G01J 1/16* | (2006.01) | |
| *H05B 45/22* | (2020.01) | |
| *H05B 47/175* | (2020.01) | |

(52) U.S. Cl.
CPC ......... *F25D 27/005* (2013.01); *F25D 23/028* (2013.01); *G01J 1/16* (2013.01); *H05B 45/22* (2020.01); *H05B 47/175* (2020.01); *F25D 2327/001* (2013.01); *F25D 2400/361* (2013.01); *F25D 2700/00* (2013.01)

(58) Field of Classification Search
CPC ......... F25D 27/005; F25D 27/00; F25D 23/02
See application file for complete search history.

(56) References Cited

U.S. PATENT DOCUMENTS

| | | | |
|---|---|---|---|
| 8,789,900 B2 | 7/2014 | Laible et al. | |
| 2014/0144083 A1* | 5/2014 | Artwohl | G09F 23/065 49/70 |
| 2016/0095450 A1* | 4/2016 | Trulaske, Sr. | A47F 3/005 49/70 |
| 2017/0191744 A1 | 7/2017 | Koo | |
| 2019/0307263 A1* | 10/2019 | Lee | A47F 3/0434 |

(Continued)

FOREIGN PATENT DOCUMENTS

| | | |
|---|---|---|
| CN | 103250018 | 8/2013 |
| EP | 4119871 | 7/2022 |

(Continued)

OTHER PUBLICATIONS

Extended European Search Report in European Appln. No. 22213658.2, mailed on Apr. 12, 2023, 9 pages.

*Primary Examiner* — William N Harris
(74) *Attorney, Agent, or Firm* — Fish & Richardson P.C.

(57) ABSTRACT

A home appliance includes a cabinet having a space and a door configured to open and close the space. The door includes a lighting device including a light source and a base on which the light source is installed, and a front plate defining a front appearance of the door, in which light irradiated from the light source passes through the front plate. When the light source is turned on, the light source irradiates light with a second color, and when light with the second color passes through the front plate, the front plate glows with a first color different from the second color.

22 Claims, 15 Drawing Sheets

(56) References Cited

U.S. PATENT DOCUMENTS

2020/0088457 A1* 3/2020 Kang .................... A47F 3/0434
2020/0173716 A1* 6/2020 Choi ...................... G03B 29/00

FOREIGN PATENT DOCUMENTS

| JP | 4483733 | 2/2007 |
| KR | 10-2008-0076594 | 8/2008 |
| WO | WO 2023033566 | 3/2023 |

* cited by examiner (a)

(b)

(c)

REFRIGERATOR AND HOME APPLIANCE

CROSS-REFERENCE TO RELATED APPLICATIONS

The present application claims priority under 35 U.S.C. 119 and 35 U.S.C. 365 to Korean Patent Application No. 10-2021-0181182, filed on Dec. 17, 2021, which is hereby incorporated by reference in its entirety.

FIELD

The present disclosure relates to a refrigerator and a home appliance.

BACKGROUND

In general, a refrigerator is a home appliance for storing foods in an internal storage space, which is shield by a refrigerator door, at a low temperature by low temperature air. The refrigerator cools the inside of the storage space using cool air generated by heat-exchanging with a refrigerant that circulates a cooling cycle to store the foods in an optimum state.

Such refrigerators tend to increase more and more in size and provide multi-functions due to the trends of change of dietary life and high quality, and accordingly, refrigerators provided with various structures and convenience devices in consideration of user convenience are brought to the market.

In order to harmonize with an environment in which the refrigerator is disposed or with surrounding furniture or home appliances, technologies structures for varying an outer appearance of a door front of the refrigerator are developed, and this trend is the same throughout the home appliance.

U.S. Pat. No. 8,789,900 (Cited Reference 1) discloses a structure in which a decoration panel forming an outer appearance is installed on a door front of a refrigerator, and here, the outer appearance of the door front is formed according to a user's preference by detachably configuring the decoration panel.

However, the refrigerator of the Cited Reference 1 has a problem in that, when a user wants to change the outer appearance, the entire decoration panel needs to be removed and replaced, and it is not possible to use the decoration panel before replacement any longer.

To solve this limitation, Chinese Patent Application No. 103250018 (Cited Reference 2) discloses a refrigerator in which a reflective layer and a transparent panel are disposed on a door front and colored light emitting members are mounted on both side ends of the reflective layer to cause the transparent panel to glow with set color.

However, Cited Reference 2 does not disclose technology in which a user can actively change the color of a light emitting member that operates when a specific event occurs.

SUMMARY

The present embodiment provides a refrigerator and home appliance capable of changing a color of a door to a color desired by a user when a specific event occurs.

Selectively or additionally, in the present embodiment, it is possible to provide a door and home appliance in which a front plate of a door glows with the same color as a color selected by a user by controlling the color of light emitted from a light source in consideration of the color of the front plate of the door.

Selectively or additionally, in the present embodiment, it is possible to provide a door and home appliance in which a door glows with the same color as a color selected by a user even if the color of a front plate of a door varies according to devices.

A home appliance according to an embodiment of the present disclosure may comprise a cabinet having a space and a door configured to open and close the space.

The door may comprise a lighting device including a light source and a base on which the light source is installed. The door may comprise a front plate defining a front appearance of the door, light irradiated from the light source passing through the front plate.

When the light source is turned on, the light source may irradiate light with a second color.

When light with the second color passes through the front plate, the front plate may glow with a first color different from the second color.

The home appliance may further comprise a color selector configured to select a color of the front plate and a controller configured to control the light source.

When a user selects the first color through the color selector, the controller may control the light source to irradiate light with the second color in which one or more of an R value, G value and B value of the first color are different.

A display may be provided on a front surface of the door. The color selector may be displayed on the display.

By light transmission characteristic of the front plate, the front plate may glow with the first color different from the second color when light with the second color passes through the front plate.

Colors to which a correction value based on the light transmission characteristic of the front plate is applied may be displayed on the color selector.

The light transmission characteristic may be determined by a background color of the front plate.

The background color may have brightness greater than 0 and may be a color other than black.

A specific pattern may be printed on the front plate to have a background color, a film on which a specific pattern or a pattern having a background color is printed may be attached to the front plate or a coating or deposition layer having a background color and texture may be formed on the front plate.

The light transmission characteristic may be determined by performing surface treatment such as imprinting, etching or glass printing on the front plate.

The light source may operate with an R value, a G value and a B value which are input values corresponding to the second color. An R value, a G value and a B value corresponding to the first color of the front plate may be measured through a measurement tool.

An R correction value, a G correction value and a B correction value may be obtained by comparing the input R value, G value and B value with the measured R value, G value and B value.

The measurement tool may comprise a sensor or a camera.

A door selector configured to select a door on which a specific color selected by the color selector will be displayed may be further displayed on a screen of the display.

The home appliance may further comprise a memory.

When a specific door is selected by the door selector and a specific color is selected by the color selector, a color in which one or more of an R value, G value and B value of the selected specific color is corrected and the selected specific door may be stored in the memory.

When information on the front plate is input on the display, a color selector matching the input information may be displayed on the display.

The color selector may be a color selector to which a correction value based on light transmission characteristic corresponding to the input information on the front plate is applied.

The home appliance may further comprise a communication interface capable of communicating with a remote device. The first color may be selected or the first color may be changed to a third color on a display of the remote device.

The home appliance may further comprise a memory. When the first color is selected on the display of the remote device, an R value, G value and B value of the second color, one or more of which are different from one or more of an R value, G value and B value of the first color, may be received from the remote device, and the received R value, G value and B value of the second color may be stored in the memory.

The home appliance may further comprise a controller configured to control the light source and a memory having a correction value.

When the first color is selected on the display of the remote device, an R value, G value and B value of the first color may be received from the remote device.

The controller may apply the correction value stored in the memory and store the R value, G value and B value of the second color in the memory.

The home appliance may further comprise a display configured to select a color of the front plate and an illuminance sensor configured to detect illuminance.

A color selector, to which light transmission characteristic of the front plate and an illuminance value detected by the illuminance sensor are applied as a correction value, may be displayed on the display.

Any one of an R value, G value and B value of the first color when the illuminance value is a first illuminance value may be greater than any one of an R value, G value and B value of the first color when the illuminance value is a second illuminance value less than the first illuminance value.

The home appliance may further comprise a memory configured to store cumulative operation time information of the light source.

When the cumulative operation time of the light source exceeds a reference time, one or more of an R value, G value and B value irradiated by the light source may be increased or a current value applied to the light source may be increased.

When the door comprises a plurality of doors, a first door of the plurality of doors may comprise a first front plate having first light transmission characteristic and a second door of the plurality of doors may comprise a second front plate having second light transmission characteristic.

A light source of the first door may irradiate light with a second color such that the first front plate glows with the first color, and a light source of the second door may irradiate light with a third color such that the second front plate glows with the first color.

When the door comprises a plurality of doors, a first door of the plurality of doors may comprise a first front plate having first light transmission characteristic, a second door of the plurality of doors may comprise a second front plate having second light transmission characteristic. When a light source of the first door irradiates light with a second color, the light with the second color may pass through the first front plate and the first front plate may glow with a first color different from the second color. When a light source of the second door irradiates light with a second color, the light with the second color may pass through the second front plate and the second front plate may glow with a third color different from the second color.

DETAILED DESCRIPTION OF THE EMBODIMENTS

Hereinafter, detailed embodiments will be described in detail with reference to the accompanying drawings. However, the present disclosure is limited to the embodiments in which the spirit of the present disclosure is proposed, and other degenerate idea or other embodiments included in the scope of the present disclosure may be easily proposed by addition, changes, deletions, etc. of other elements.

Hereinafter, a refrigerator will be described as an example of a home appliance, but the description of the refrigerator according to the present disclosure may be applied to various home appliances including a cabinet having a space therein and a door configured to open and close the space. The home appliance may include, for example, an air conditioner, a clothes manager, a washing machine, a dryer, a dish washing machine, a cooking appliance, and the like.

Furthermore, a home appliance according to the present disclosure is not limited to a home appliance in which an inner space of a cabinet is opened and closed, and it is to be noted that the home appliance according to the present disclosure is also applicable to a home appliance in which an inner space of a cabinet is not opened and closed.

Prior to a description, directions are defined. In an embodiment of the present disclosure, a direction toward a door is defined as a front direction with respect to a cabinet shown in FIGS. 1 and 2, a direction toward the cabinet with respect to the door is defined as a rear direction, a direction toward a bottom on which a refrigerator is installed is defined as a downward direction, and a direction away from the bottom is defined as an upward direction.

Figure 1:
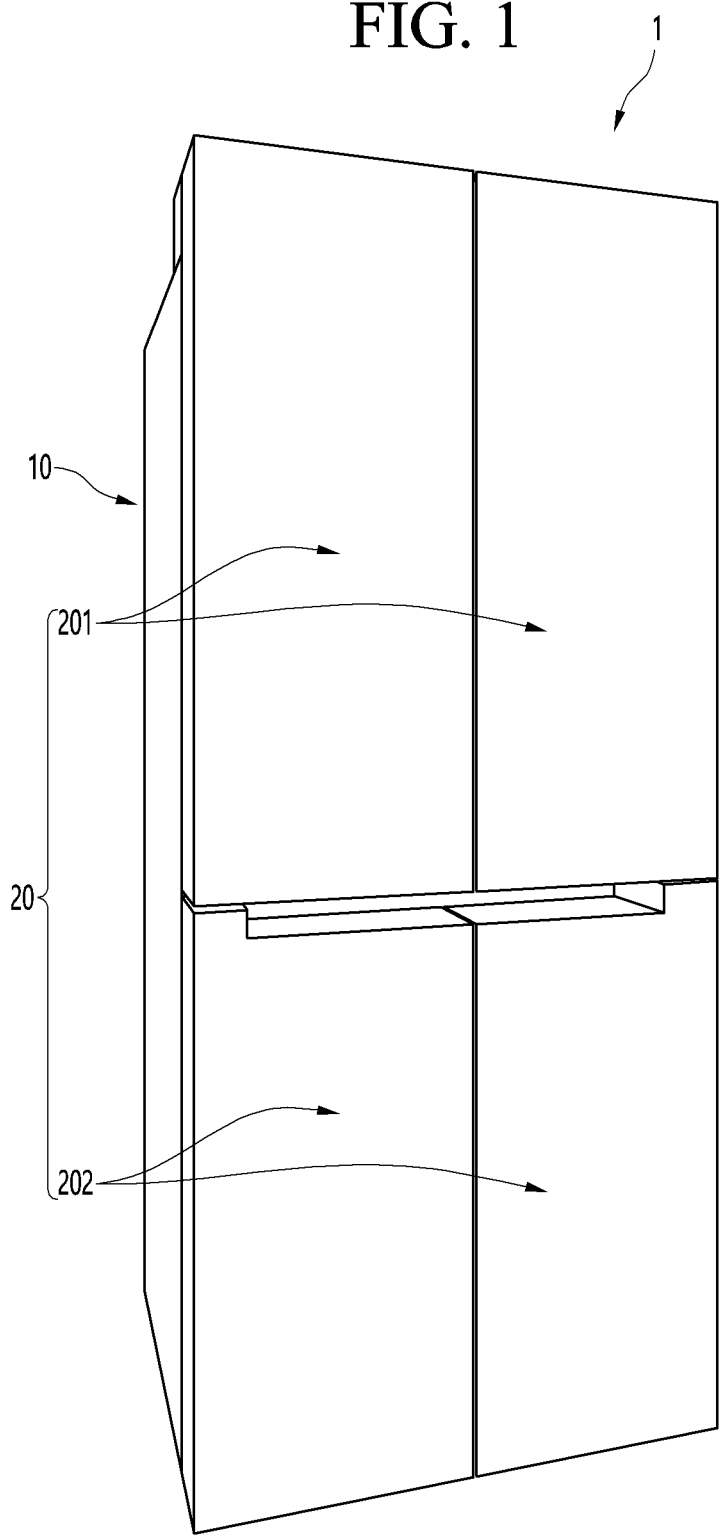
FIG. 1 is a front view of a refrigerator according to an embodiment of the present disclosure.

FIG. 1 is a perspective view of a refrigerator according to an embodiment.

Referring to FIGS. 1, a refrigerator 1 according to an embodiment of the present disclosure may include a cabinet 10 defining a storage space (or storage section) and a door 20 for opening and closing the storage space of the cabinet 10.

For example, the cabinet 10 may form the storage space partitioned in a vertical direction, a refrigerating compartment may be formed at an upper portion, and a freezing compartment may be formed at a lower portion. The refrigerating compartment may be referred to as an upper storage space, and the freezing compartment may be referred to as a lower storage space.

The door 20 may open and close each of the refrigerating compartment and the freezing compartment. For example, the door 20 may be rotatably mounted on the cabinet 10, and the refrigerating compartment and the freezing compartment may each be opened and closed by rotation. Alternatively, the door 20 may be configured to open and close the refrigerating compartment and/or the freezing compartment by being drawn in and out.

The door 20 may include a refrigerating compartment door 201 for opening and closing the refrigerating compartment and a freezing compartment door 202 for opening and closing the freezing compartment. The refrigerating compartment door 201 may be referred to as an upper door, and the freezing compartment door 202 may be referred to as a lower door.

The refrigerating compartment door 201 may include a pair of a left refrigerating compartment door and a right refrigerating compartment door that are arranged side by side. The left refrigerating compartment door and the right refrigerating compartment door may open and close the refrigerating compartment while being independently rotated. The left refrigerating compartment door and the right refrigerating compartment door may be disposed adjacent to each other and may have the same size.

The freezing compartment door 202 may include a pair of a left freezing compartment door and a right freezing compartment door that are arranged side by side. The left freezing compartment door and the right freezing compartment door may open and close the freezing compartment while being independently rotated. The left freezing compartment door and the right freezing compartment door may be disposed adjacent to each other and may have the same size.

Needless to say, although a refrigerator having a structure in which the refrigerating compartment is defined above the freezing compartment is described as an example in this embodiment, the present disclosure may be applied to all types of refrigerators equipped with a door without being limited to a type of a refrigerator.

An outer appearance of the front surface of the refrigerator 1 may be formed in the state in which the door 20 is closed and may form the out appearance of the refrigerator 1 viewed from the front in the state in which the refrigerator 1 is installed.

The door 20 may have a structure in which a front surface selectively emits light and may be configured to glow with set color or brightness. Thus, a user may change front color or brightness of the door 20 without separating or disassembling the door 20 and may change the overall outer appearance of the refrigerator 1.

Hereinafter, the structure of the door 20 will be described in detail with reference to drawings.

Figure 2:
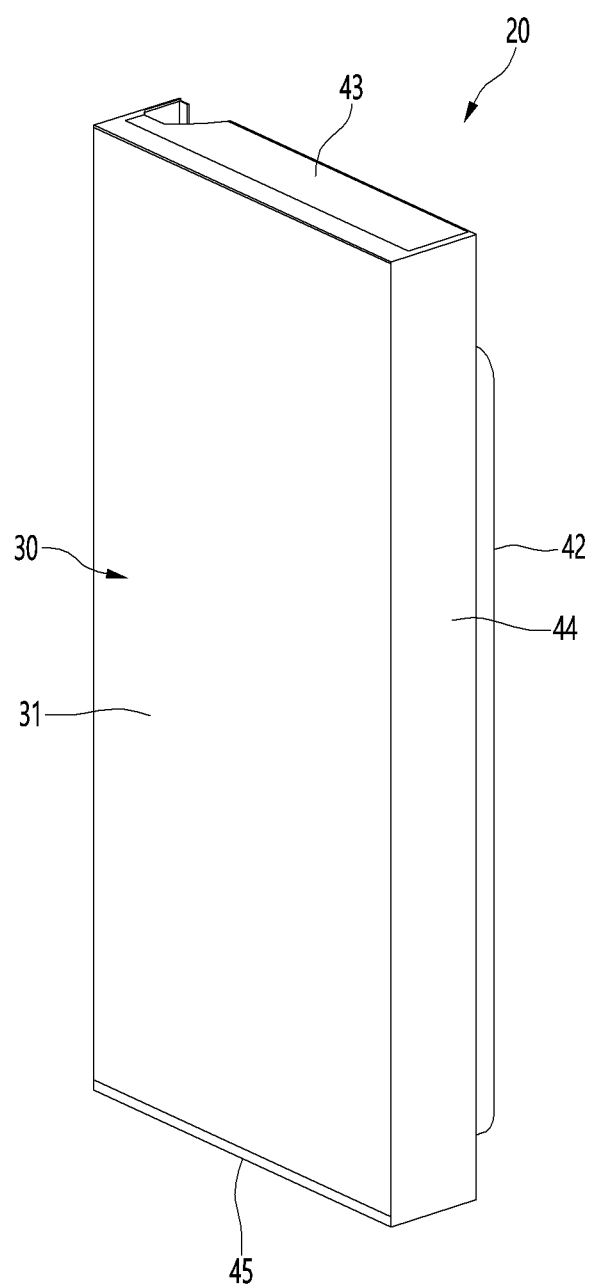
FIG. 2 is a perspective view of a refrigerator door according to an embodiment present disclosure.
Figure 3:
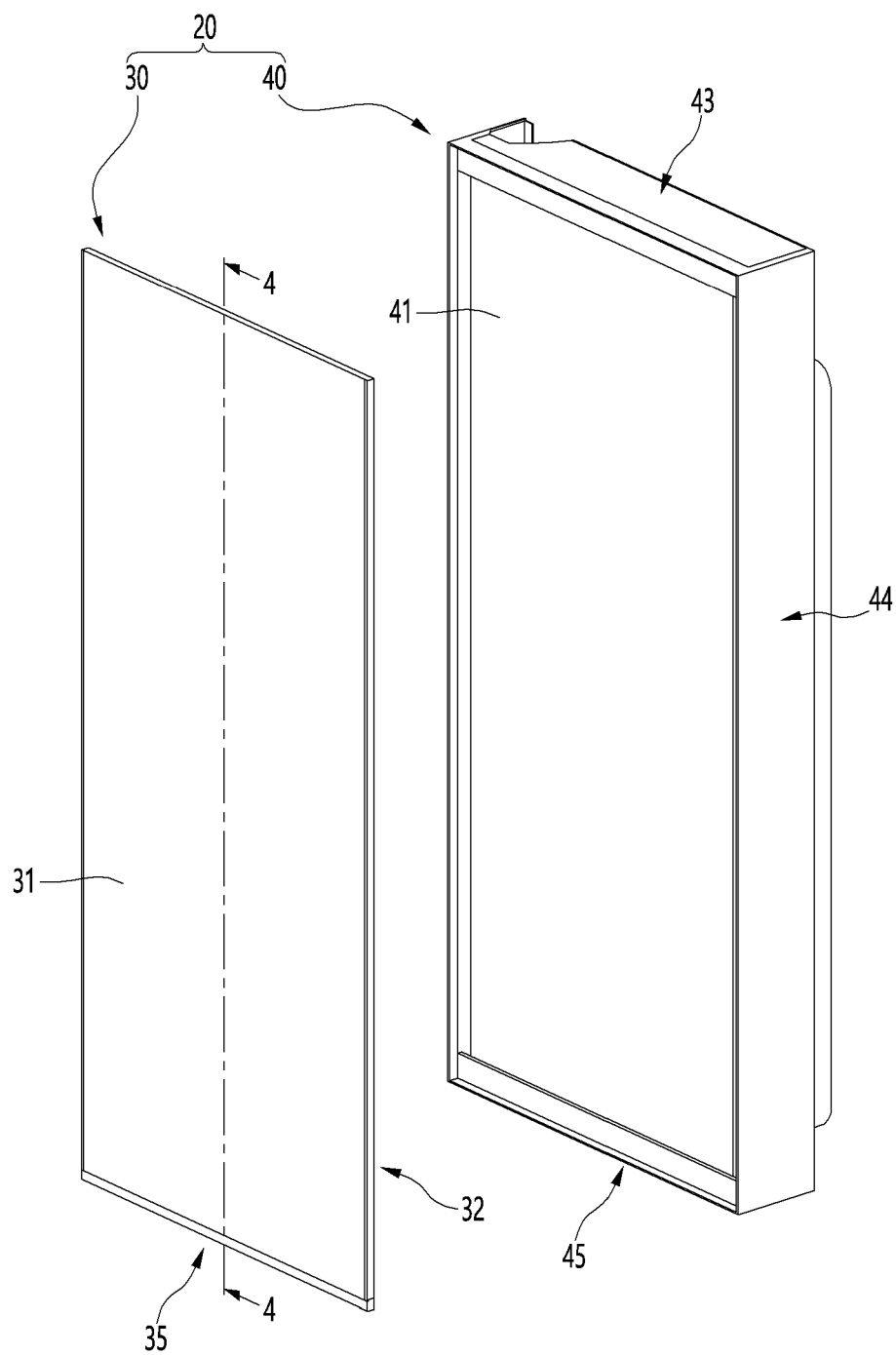
FIG. 3 is a view illustrating a state in which a panel assembly is separated from the refrigerator door.

FIG. 2 is a perspective view of a refrigerator door according to an embodiment present disclosure. FIG. 3 is a view illustrating a state in which a panel assembly is separated from the refrigerator door.

As illustrated in FIGS. 2 and 3, the door 20 may include a door body 40 forming the overall shape of the door 20, and a panel assembly 30 forming a front appearance of the door 20. That is, the door 20 may be configured in such a way that the panel assembly 30 is mounted on a front surface of the door body 40.

The door body 40 may include a body plate 41 defining a front surface and a door liner 42 defining a, rear surface.

The body plate 41 may be formed of a metal material and may be formed in a plate shape having a size corresponding to the panel assembly 30. The door liner 42 may be formed of a plastic material and may form a bottom shape of the door 20.

The door body 40 may further include a side decoration 44 forming right and left side surfaces of the door body 40. The side decoration 44 may connect right and left side ends of the body plate 41 and right and left side ends of the door liner 42.

The door body 40 may include an upper cap decoration 43 and a lower cap decoration 45 that form top and bottom surfaces of the door body 40. The upper cap decoration 43 may be connected to an upper end of the side decoration 44, an upper end of the body plate 41, and an upper end of the door liner 42. The lower cap decoration 45 may be connected to a lower end of the side decoration 44, a lower end of the body plate 41, and a lower end of the door liner 42.

An outer appearance of the door body 40 may be formed by the body plate 41, the door liner 42, the side decoration 44, the upper cap decoration 43, and the lower cap decoration 45.

An insulator may be filled in an internal space of the door body 40, which is formed by coupling the body plate 41, the door liner 42, the side decoration 44, the upper cap decoration 43, and the lower cap decoration 45, and may provide an insulation structure to prevent heat from being transferred through the door 20. The insulator may be formed, for example, as a time elapses after a foaming liquid is filled. The door body 40 may be provided with an injection hole for filling the foaming liquid.

An opened forward panel receiving space 410 may be formed on a front surface of the door body 40. That is, front ends of the side decoration 44, the upper cap decoration 43, and the lower cap decoration 45 may protrude more forward than the front surface of the body plate 41.

A panel receiving space 410 that is opened forward may be defined at a front side of the door body 40. The panel receiving space 410 may be formed with a size corresponding to the size of the panel assembly 30 and the panel assembly 30 may be inserted into the panel receiving space 410. A circumference of the panel assembly 30 may be supported by a circumferential surface of the panel receiving space 410, that is, protruding portions of the side decoration 44, the upper cap decoration 43, and the lower cap decoration 45.

The panel assembly 30 may be formed in a plate shape as a whole and may be formed with a size corresponding to a front surface of the door body 40. Thus, when the panel assembly 30 is mounted on the front surface of the door body 40, the panel assembly 30 may shield the front surface of the door body 40 and may form an outer appearance of the front surface of the door 20. Since the panel assembly 30 may form the outer appearance of the front surface of the door 20, the panel assembly 30 may be referred to as a door panel, and since the panel assembly 30 may form the outer appearance of the front surface of the refrigerator 1, the panel assembly 30 may also be referred to as an exterior panel.

In the state in which the panel assembly 30 is mounted on the door body 40, a rear surface of the panel assembly 30 may be fixed in contact with the body plate 41. To fixedly mount the panel assembly 30, a lower end of the panel assembly 30 may be caught and restrained with a lower end of the lower cap decoration 45, and an upper end of the panel assembly 30 may be coupled to an upper end of a front surface of the upper cap decoration 43 to firmly couple the panel assembly 30 to the door body 40. The panel assembly 30 may be detachably mounted from the door body 40 for services and maintenance.

A front surface of the panel assembly 30 may be exposed forward in the state in which the panel assembly 30 is mounted on the door body 40, and the panel assembly 30 may substantially form the outer appearance of the front surface of the door 20. The panel assembly 30 may be configured to emit light from an entire front thereof and may be configured to glow with various colors.

To this end, a lighting device 36 may be provided inside the panel assembly 30. A wire may be connected to the lighting device 36 in order to supply and control power. The wire may be exposed outside the rear surface of the panel assembly 30, and a connector may be provided on an end of the wire.

A structure connected to the connector of the wire to supply power to the lighting device 36 may be provided on a front surface of the door body 40.

Hereinafter, the structure of the panel assembly 30 will be described in more detail with reference to drawings.

Figure 4:
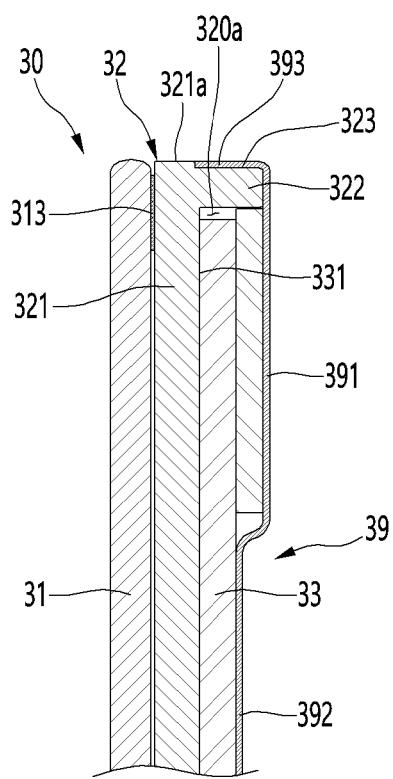
FIG. 4 is a cross-sectional view taken along line 4-4 of FIG. 3.
Figure 4:
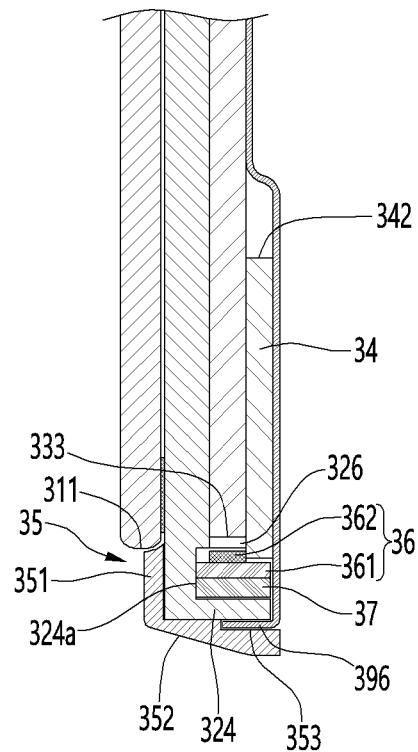
Figure 5:
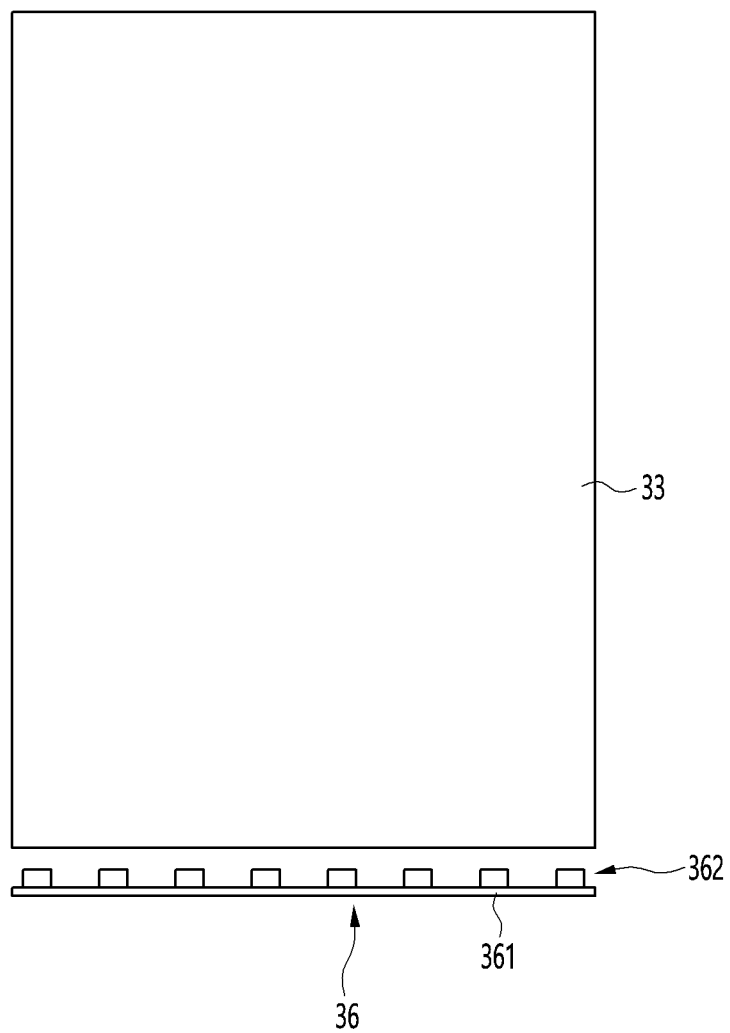
FIG. 5 is a view illustrating arrangement of a light guide plate and a light source.

FIG. 4 is a cross-sectional view taken along line 4-4 of FIG. 3. FIG. 5 is a view illustrating arrangement of a light guide plate and a light source.

Referring to FIGS. 4 and 5, the panel assembly 30 may include a front plate 31 forming an outer appearance of the front surface, the lighting device 36 for emitting light to cause the front plate 31 to glow.

The panel assembly 30 may further include a light guide plate 33 for guiding the light emitted from the lighting device 36.

The panel assembly 30 may further include a diffusion member 32 allowing the light guide plate 33 to be spaced apart from the front plate 31 and diffusing the light. The diffusion member 32 may also be referred to as a support member in terms of supporting the light guide plate 33.

The panel assembly 30 may further include a back cover 39 defining a rear surface of the panel assembly 30.

The front plate 31 may be formed in a rectangular plate shape and may be formed of a material that transmits light therethrough. For example the front plate 31 may be formed of a glass material such as blue glass, white glass, and vapor deposition glass or may be formed of other materials for transmitting light therethrough, such as ABS, PMMA, or PC. The front plate 31 may be referred to as a transparent plate or an out plate.

By the light transmission characteristic of the front plate 31, for example, when light with a second color passes through the front plate 31, the front plate 31 may glow with a first color different from the second color.

The light transmission characteristic may be determined by the background color of the front plate.

The front plate 31 may be formed to be transparent to allow light reflected by the light guide plate 33 to be transmitted. In this case, transparency may be defined to a degree to which light reflected from the light guide plate is transmitted and irradiated to the outside.

The front plate 31 may be formed to have color and may be formed to represent different colors depending on an operation or on and off states of the lighting device 36. For example, a specific design or pattern may be printed on the front plate 31 to have specific color. The light transmission characteristic may be determined by attaching a film, on which a specific pattern or a pattern having a background color is printed, to the front plate 31 or performing surface treatment such as imprinting, etching, glass printing on the front plate 31 or, a coating or deposition layer having a background color and texture may be formed to form an appearance of the front plate 31.

The front plate 31 may be configured to transmit light emitted from the lighting device 36 but components behind the front plate 31 may not be seen therethrough. That is, in the state in which the lighting device 36 is turned off, components inside the panel assembly 30 may be prevented from being seen to the outside through the front plate 31 due to the color of the front plate 31.

At this time, the front plate 31 may be formed to have a color of at least brightness of 0 or more other than black in a state in which the lighting device 36 is turned off. That is, in a state where the refrigerator 1 is installed, the front surface of the refrigerator 1 may be displayed in a color other than black, and the color of the front surface of the refrigerator may be changed according to the operation of the lighting device 36.

In the panel assembly 30, the entire front surface of the front plate 31 may be exposed to the outside. Thus, the light diffused by the diffusion member 32 may be transmitted through the front plate 31 as a whole, and thus, the entire front surface of the front plate 31 may glow.

A rear surface of the front plate 31 may be coupled to a front surface of the diffusion member 32.

The light guide plate 33 may be positioned at a rear spaced apart from the front plate 31 by the diffusion member 32 and may be configured to guide light emitted from the lighting device 36 disposed at the upper end of the light guide plate 33 forward.

For example, the light guide plate 33 may be formed of transparent acrylic, plastic, or a transparent polymer material. The light guide plate 33 may have a diffusing agent added thereto for diffusing light entrance on the light guide plate 33 or a pattern for diffusing light may be further formed on the light guide plate 33. Thus, light may be transferred to the front plate 31 by the light guide plate 33, and in this case, a pattern of the light guide plate 33 may be set to cause the entire front surface of the front plate 31 to glow with uniform brightness.

A load of the light guide plate 33 may be supported by the diffusion member 32 and a front surface of the light guide plate 33 may be pressed toward the diffusion member 32 by the back cover 39.

The diffusion member 32 may be disposed between the front plate 31 and the light guide plate 33. The diffusion member 32 may allow the light guide plate 33 to be maintained at a predetermined distance from the front plate 31 and may diffuse light emitted from the light emission surface of the light guide plate 33.

The front surface of the diffusion member 32 may support the front plate 31 and opposite side surfaces of the diffusion member 32 may restrain both ends of the light guide plate 33. The front surface of the diffusion member 32 may have a size greater than or equal to that of the light guide plate 33, and in the state in which the light guide plate 33 is mounted, the rear surface of the diffusion member 32 and the light guide plate 33 may be maintained in the state of being in surface contact with each other.

The diffusion member 32 may include a plate-shaped front surface portion 321, on which the front plate 31 is mounted, and an extension portion extending from a circumference of the front surface portion 321. The front surface portion 321 and the extension portion may define an accommodation space 320a in which the light guide plate 33 is disposed.

The extension portion is disposed to cover the circumference of the light guide plate 33. The circumference of the light guide plate 33 may include, for example, a top surface, a bottom surface, and both side surfaces.

For example, the extension portion may include an upper extension portion 322 extending from an upper end of a rear surface of the front surface portion 321, a lower extension portion 324 extending from a lower end of the rear surface of the front surface portion 321, and a pair of side surface portions extending from both left and right ends of the front surface portion 321.

The upper extension portion 322, the lower extension portion 324, and the pair of side surface portions may define the accommodation space 320a in which the light guide plate 33 is disposed. Thus, the diffusion member 32 not only serves to diffuse light, but also serves to accommodate and support the light guide plate 33.

The front surface portion 321 may be formed like a plate corresponding to the front plate 31, and a front surface of the light guide plate 33 may be in close contact with a rear surface of the front surface portion 321.

According to this embodiment, since the front surface portion 321 of the diffusion member 32 is entirely disposed between the front plate 31 and the light guide plate 33, even if the light guide plate 33 is deformed by the heat, the light guide plate 33 may be prevented from being in direct contact with the front plate 31. Thus, it is possible to prevent a dark area such as stains from occurring on the front plate 31.

The front surface portion 321 and the rear surface of the front plate 31 may be coupled to each other by an adhesion portion 313. The adhesion portion 313 may include, for example, a sealant or a double-sided tape.

The side surface portions may extend backward from right and left side ends of the front surface portion 321 and may be formed to restrain right and left side ends of the light guide plate 33. The side surface portions may be spaced apart from at least one of both left and right side surfaces of the light guide plate 33. When the light guide plate 33 moves to left and right sides, the side surface portions may be in contact with at least one surface of both the left and right side surfaces to restrict the at least one surface. When it is considered that the light guide plate 33 is expanded by heat, the side surface portions may be spaced apart from at least one of the left and right side surfaces of the light guide plate 33.

Each of the upper extension portion 322 and the lower extension portion 324 extends backward from the front surface portion 321, and a length of each of the upper extension portion 322 and the lower extension portion 324 is greater than a thickness of the light guide plate 33.

The diffusion member 32 may be made of a material for transmitting light therethrough and may be entirely formed by injection or extrusion as a single component.

The diffusion member 32 may be made of a transparent or translucent material as a whole. The diffusion member 32 itself may be provided to have a color. Thus, when viewed from the front of the panel assembly 30, a color, texture, or shape of the front surface of the panel assembly 30 may be determined by the diffusion member 32.

The diffusion member 32 may further include a light guide plate support 326 supporting a bottom surface 333 of the light guide plate 33. The light guide plate support 326 may extend backward from the rear surface of the front surface portion 321 and may be disposed above the lower extension portion 324 to be spaced apart from the lower extension portion 324.

To stably support the load of the light guide plate 33, the diffusion member 32 may include a plurality of light guide plate supports 326. The plurality of light guide plate supports 326 may be disposed to be spaced apart from each other in the horizontal direction.

The lighting device 36 may be accommodated in the diffusion member 32. The diffusion member 32 may include a receiving groove 324a (or receiving portion) that receives a portion of the lighting device 36.

The receiving groove 324a may be defined as a rear portion of the front surface portion 321 is recessed forward. Thus, the portion in which the receiving groove 324a is defined in the front surface portion 321 may be thinner than other portions.

The receiving groove 324a may be defined between the light guide plate support 326 and the lower extension portion 324. Thus, when the lighting device 36 is received in the receiving groove 324a, the lighting device 36 may be disposed below the light guide plate support 326.

The lighting device 36 may include a substrate 361 (or a base) and the light source 362. The substrate 361 may be provided in a plate shape to be elongated in the left and right direction.

The plurality of light sources 362 may be arranged at a constant interval on the substrate 361. The light source 362 may be disposed to radiate light toward the bottom surface 333 of the light guide plate 33. That is, the bottom surface 333 of the light guide plate 33 is a light entrance surface, and the front surface 331 of the light guide plate 33 is the light emission surface.

The light source 362 may be disposed to emit light toward the lower end of the light guide plate 33.

The light source 362 may be disposed vertically below the bottom surface 333 of the light guide plate 33, i.e., may be disposed to face the bottom surface 333 of the light guide plate 33.

The light source 362 may be provided as, for example, an LED. The light source 362 may be configured as an RGB LED capable of irradiating light with various colors according to a control of the controller 13, which will be described later. That is, the light source 362 may emit light with various colors under control of the controller 13 that will be described later, and thus the front plate 31 may glow with color set by the controller 13. A color of the front appearance of the refrigerator 1 may be determined according to color of the front plate 31.

The light source 362 may include an LED for emitting light with specific color other than the RGB LED and may include a combination of a plurality of LEDs for emitting light with different colors. For example, the plurality of light sources 362 may include red, green, and blue LEDs and may sequentially and repeatedly arranged. Under control of the controller 13, operations of the light sources 362 may be combined to cause the front plate 31 to glow with desired color.

An interval between the light sources 362 may be smaller than the right and left width of the light guide plate support 326, and thus the light guide plate support 326 may be disposed between the light sources 362. Thus, the light emitted from the light source 362 may pass between two adjacent light guide plate supports 326 and be irradiated to the bottom surface 333 of the light guide plate 33.

The panel assembly 30 may further include a substrate supporter 37 seated on the lower extension portion 324 of the diffusion member 32.

The substrate supporter 37 may support the substrate 361 while being seated on the lower extension portion 324. A substrate supporter 37 may dissipate heat generated by the lighting device 36 by thermal conduction.

The substrate supporter 37 may be made of, for example, a metal material. For example, the substrate supporter 37 may be made of an aluminum material having high thermal conductivity. The substrate supporter 37 may be extruded with a metal material to have the same cross-sectional shape in the longitudinal direction.

A portion of the substrate supporter 37 may be received in the receiving groove 324a. The substrate supporter 37 may be in contact with the back cover 39 while the back cover 39 is assembled. Thus, the heat generated by the lighting device 36 may be transferred toward the back cover 39 through the substrate supporter 37 and may be dissipated through the back cover 39.

The panel assembly 30 may further include a rear supporter 34 supporting the rear surface of the light guide plate 33. The rear supporter 34 may be provided in a plate shape and may be attached to the rear surface of the light guide plate 33 by an adhesive.

The rear supporter 34 may be made of an opaque material through which light transmission is restricted. The rear supporter 34 may be accommodated in the accommodation space 320a defined by the diffusion member 32. The upper extension portion 322 may cover an upper side of the rear supporter 34, and the side portions 327 and 328 may cover both the side surfaces of the rear supporter 34.

A bottom surface of the rear supporter 34 may be disposed above the substrate 361. For example, a bottom surface of the rear supporter 34 may be seated on a top surface of the substrate 361.

In this case, the upward movement of the substrate 361 may be restricted by the rear supporter 34. Since the bottom surface 333 of the light guide plate 33 is seated on the top surface of the light guide plate support 226, a set interval may be maintained between the bottom surface of the light guide plate 33 and the light source 362.

As described above, the lighting device 36 may be maintained in the fixed state, and a distance between the light guide plate 33 and the light source 362 may also be maintained at a set distance, and thus, the light irradiated from the light source 362 may be incident into the light guide plate 33 at a designed angle. Thus, the light irradiated from the light source 362 may be effectively irradiated toward the light guide plate 33, and the light reflected through the light guide plate 33 may allow the front plate 31 to glow with set brightness.

In another aspect, the rear supporter 34 may be seated on the light guide plate support 326.

The rear supporter 34 may include an opening 342 through which a portion of the back cover 39 passes.

The back cover 39 may include a cover body 391 and a bent portion extending from an edge of the cover body 391 in the horizontal direction.

The cover body 391 may be in contact with the rear surface of the rear supporter 34. The cover body 391 may be attached to the rear supporter 34 by the adhesive or may be coupled to the rear supporter 34 by a coupling member such as a screw.

The bent portion may extend forward from the edge of the cover body 391 and may include an upper bent portion 393, a lower bent portion 396, and a pair of side bent portions. The bent portion may be in contact with the diffusion member 32. For example, the bent portion may adhere to the extension portion of the diffusion member 32 by the adhesive.

For example, the upper bent portion 393 may be seated in an upper seating groove 323 having a recessed shape defined in the upper extension portion 322 of the diffusion member 32.

The lower bent portion 396 may be in contact with a bottom surface of the lower extension portion 324 of the diffusion member 32. The side bent portions may be seated in the recessed side seating grooves defined in the side extension portions.

In this embodiment, since the diffusion member 32 supports the light guide plate 33 and fixes a position of the light guide plate 33, and the back cover 39 is coupled to surround a portion of the diffusion member 32, the number of components of the panel assembly 30 itself may be reduced to reduce a thickness of the panel assembly in the front and rear direction.

The cover body 391 may further include a pressing portion 392 bent toward the light guide plate 33. The pressing portion 392 may pass through the opening 342 of the rear supporter 34 so as to be in contact with the rear surface of the light guide plate 33.

In this embodiment, the cover body 391 may press the rear supporter 34 toward the rear surface side of the light guide plate 33 while being in contact with the rear surface of the rear supporter 34, and the pressing portion 392 may directly press the light guide plate 33.

The receiving groove 324a may be defined at a position equal to or lower than that of the bottom surface 311 of the front plate 31. That is, a portion of the front surface portion 321 may extend further downward than the bottom surface 311 of the front plate 31.

The diffusion member 32 may diffuse the light irradiated from the light emission surface of the light guide plate 33. Since a portion of the diffusion member 32 is disposed lower than the bottom surface 311 of the front plate 31, there is a possibility that the light passing through the diffusion member 32 is directly irradiated to the outside without passing through the front plate 31. To prevent this phenomenon, the panel assembly 30 according to this embodiment may further include a lower trim 35.

The lower trim 35 may be coupled to the diffusion member 32 by a coupling means such as an adhesion portion or a hook.

The lower trim 35 may include a first portion 351 extending in the vertical direction and a second portion 352 extending in the horizontal direction from a lower end of the first portion 351.

At least the first portion 351 may be provided to be transparent or translucent and, as necessary, may be provided with a specific color.

The first portion 351 may cover a portion of the diffusion member 32 extending downward from the bottom surface 311 of the front plate 31. For example, the first portion 351 may be disposed to face the receiving groove 324a in front of the receiving groove 324a in the diffusion member 32.

The second portion 352 may support the lower extension portion 324. The second portion 352 may include a seating groove 353 for seating the lower bent portion 396 of the back cover 39.

Figure 6:
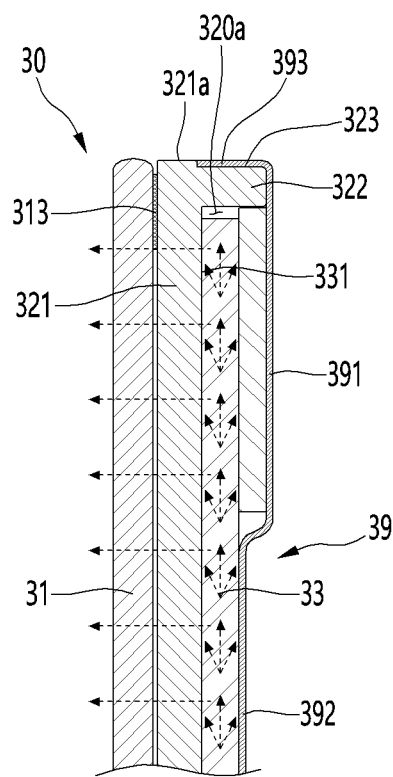
FIG. 6 is a vertical cross-sectional view showing a light emitting state of the panel assembly.
Figure 6:
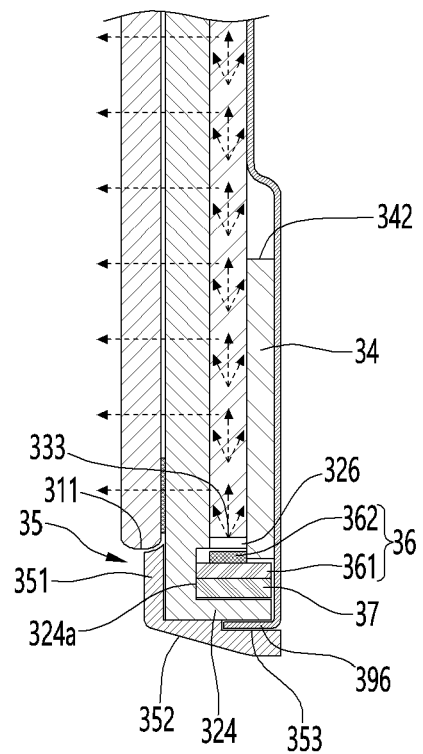
Figure 7:
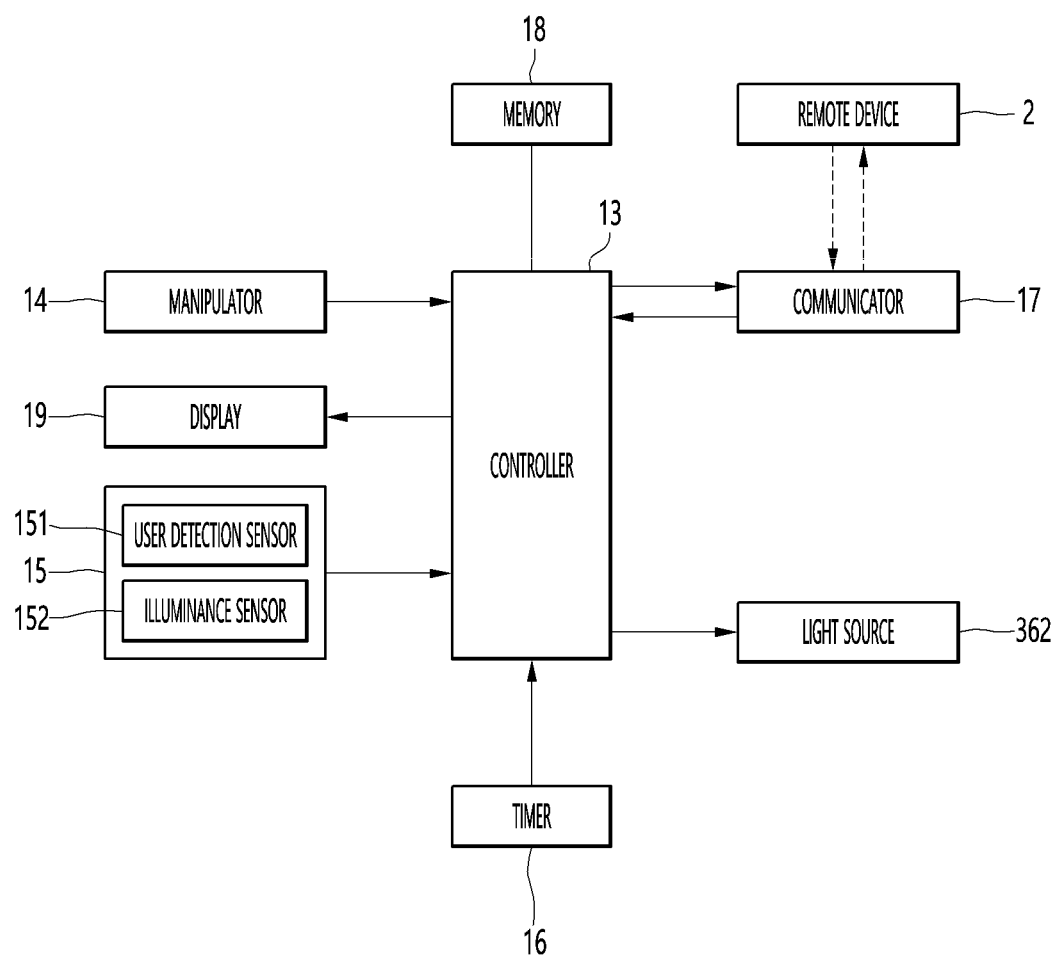
FIG. 7 is a block diagram illustrating a flow of a control signal of the refrigerator.
Figure 8:
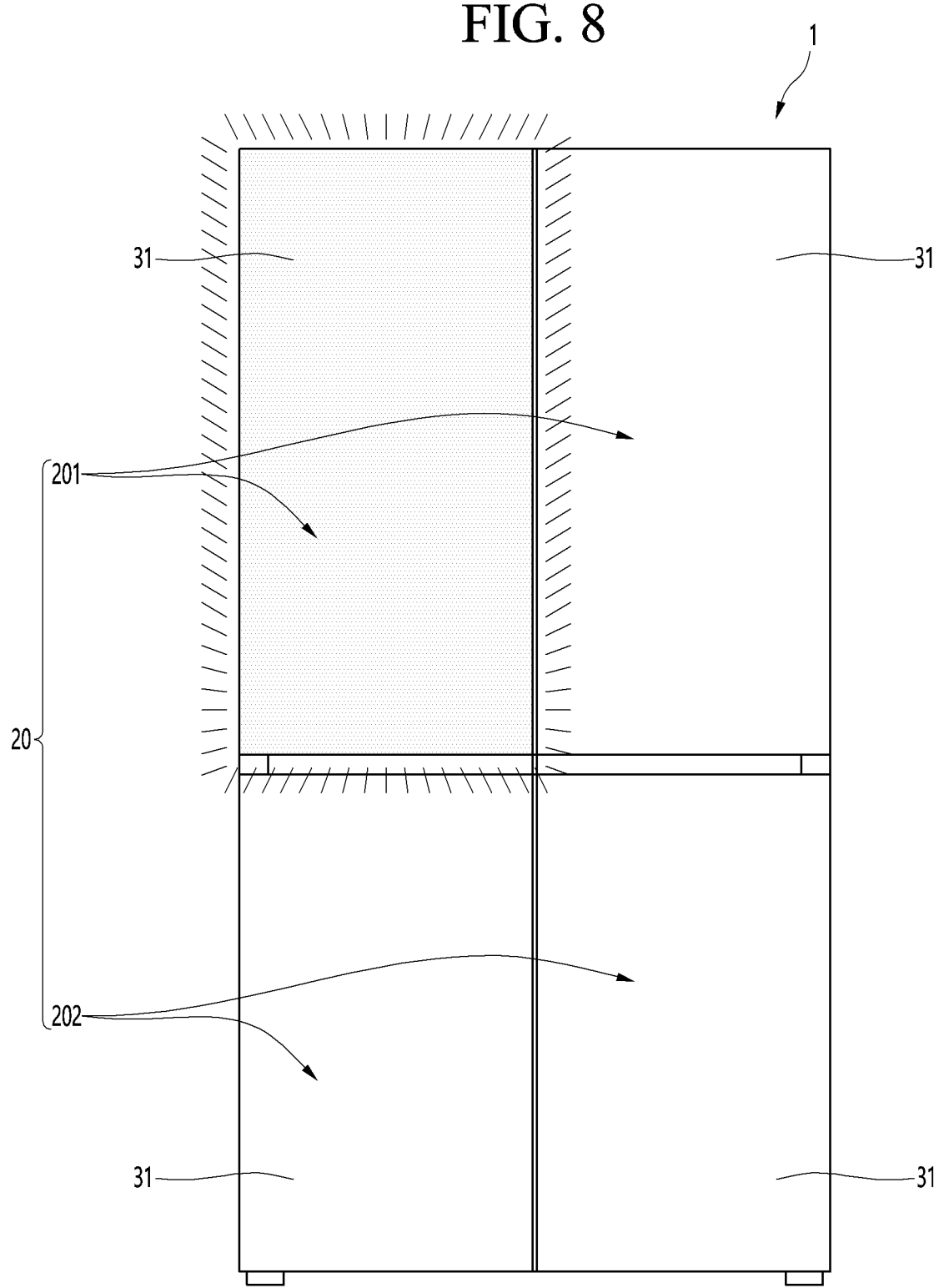
FIG. 8 is a view illustrating a state in which all doors glow in a refrigerator.
Figure 9:
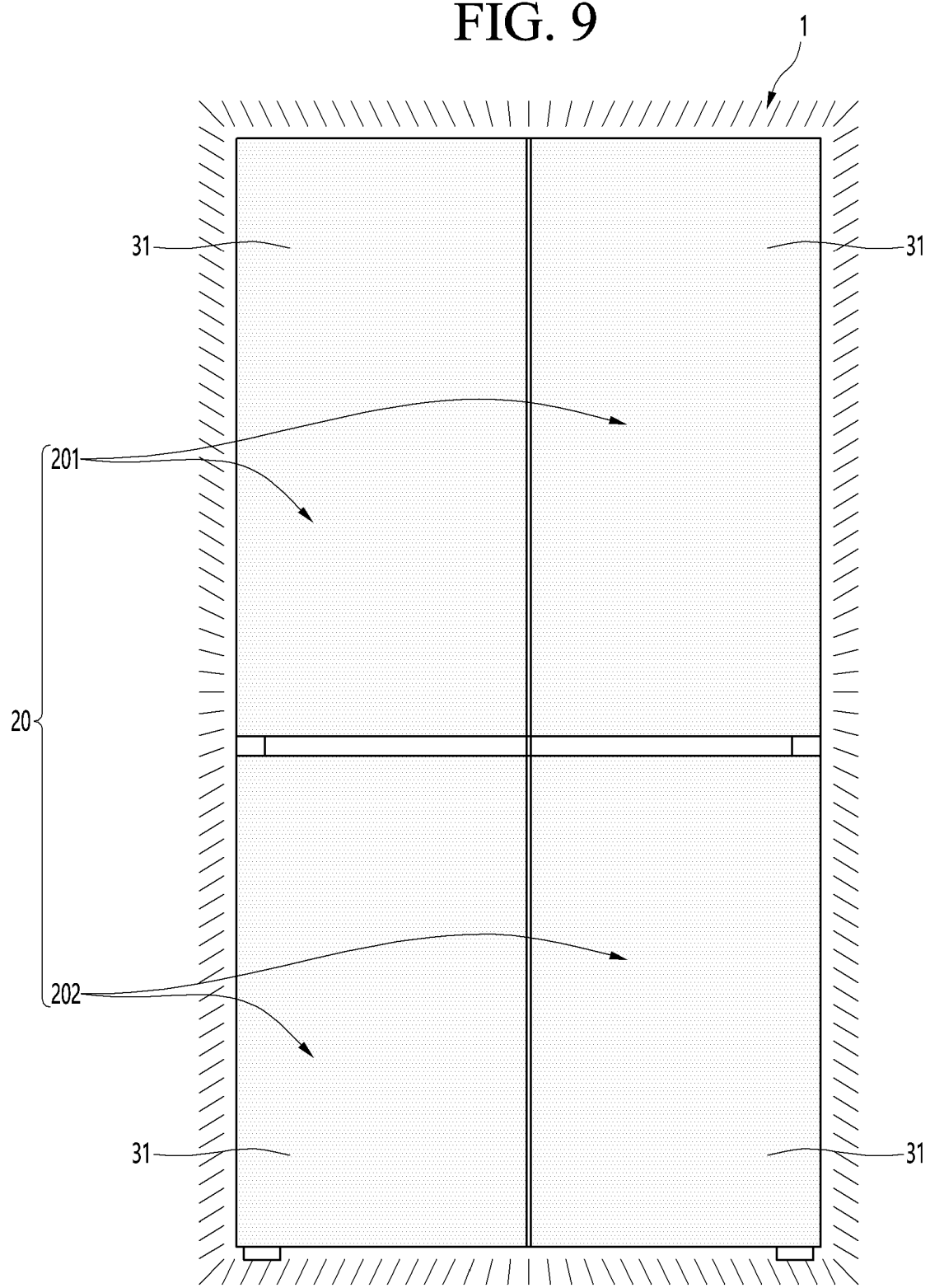
FIG. 9 is a view illustrating a state in which some doors of a plurality of doors glow.

FIG. 6 is a vertical cross-sectional view showing a light emitting state of the panel assembly. FIG. 7 is a block diagram illustrating a flow of a control signal of the refrigerator. FIG. 8 is a view illustrating a state in which all doors glow in a refrigerator. FIG. 9 is a view illustrating a state in which some doors of a plurality of doors glow.

Referring to FIGS. 6 to 9, in the refrigerator 1 according to an embodiment of the present disclosure, a front surface of the door 20 may glow via an operation of the lighting device 36.

The front surface of the door 20 may glow with any one of a plurality of colors under control of the controller 13.

The operation of the lighting device 36 may be performed by manipulation of a manipulator 14 of a user. The manipulator 14 may be disposed at one side of the refrigerator 1, and for example, may be disposed at one side of the cabinet 10. Needless to say, as necessary, the manipulator 14 may be included in the door 20 or manipulation may be input by touching and manipulating the front plate 31. That is, the user may directly manipulate the manipulator 14 to set an operation of the lighting device 36 and may turn on or off the lighting device 36.

The user may set an operation state of the lighting device 36, such as an operation time and an operation condition of the lighting device 36 and emission color of the light source 362 through manipulation of the manipulator 14.

Various commands related to an operation of the refrigerator may be input through manipulation of the manipulator 14.

As necessary, the manipulator 14 may be configured as a display for information display and manipulation.

The lighting device 36 may also be manipulated in operation and set in operation condition through a remote device 2 spaced apart from the refrigerator 1. The refrigerator 1 may communicate with the remote device 2 through a communicator 17 connected to a controller 13, and the user may control an operation of the lighting device 36 through the remote device 2.

The communicator 17 may communicate with the remote device 2 and/or a server for managing the home appliance using various methods.

For example, the communicator 17 may have a configuration for communication using at least one method of wired, wireless, or short distance communication (Bluetooth, Wi-Fi, Zigbee, and NFC). The remote device 2 may be various devices that are capable of communicating, such as a dedicated terminal, a mobile phone, a tablet, a portable PC, a desktop PC, a remote control, or a Bluetooth speaker.

The user may manipulate and set the operation state of the lighting device 36, such as an operation time and an operation condition of the lighting device 36 and emission color through manipulation of the remote device 2. For example, the lighting device 36 may be simply manipulated and set through an application or a dedicated program installed in a portable phone of the user.

The refrigerator 1 may further include a timer 16. The timer 16 may count an elapsed time after a specific event occurs.

The lighting device 36 may also be operated according to the detection result by a sensor 15.

The sensor may include a user detection sensor 151 for detecting proximity of the user. For example, the user detection sensor 151 may use various devices for detecting user approaching near the refrigerator, such as an infrared sensor, an ultrasonic sensor, or a laser sensor.

The user detection sensor 151 may be disposed at various positions for detecting proximity of the user, such as one side of the cabinet 10 or one side of the door 20, and may be disposed at various positions for detecting proximity of the user. A plurality of sensors may be disposed at different positions.

Thus, when the user approaches the refrigerator 1 by a reference distance for use of the refrigerator 1, the user detection sensor 151 may detect this and may transfer a signal to the controller 13 to turn on the lighting device 36. When the user moves away from the refrigerator 1, the user detection sensor 151 may detect this and may transfer a signal to the controller 13 to turn off the lighting device 36.

The sensor 15 may further include an illuminance sensor 152. The illuminance sensor 152 may detect an illuminance around the refrigerator 1. The illuminance sensor 152 may be provided in the cabinet 10 or the door 20. The illuminance sensor 152 may be omitted.

The refrigerator 1 may further include a display 19. The display 19 may be provided, for example, on a refrigerator door, and may include a touch panel capable of inputting commands by user's touch input or may include an LCD panel (which may be replaced with another panel) for displaying a screen.

When a user may input a command through the display 19, the user may select or change the color of light emitted from the door when the light source 362 operates, through the display 19. The color with which the door glows may be manually changed by a user or automatically changed when a preset condition is satisfied.

The operation state of the lighting device operated by the controller is now described. As shown in FIG. 6, when the lighting device 36 is turned on according to an instruction of the controller 13, light emitted from the light source 362 may be directed toward the bottom surface 333 of the light guide plate 33 and then guided along the light guide plate 33.

In this case, the light guided by the light guide plate 33 may pass through the light emission surface and be diffused while passing through the front surface portion 321, and then, may pass through the front plate 31 and be transmitted to the outside. Thus, the entire front plate 31 may brightly glow, and the front surface of the door 20 may glow with a set brightness or color.

The lighting device 36 may be turned on to cause the front surface of the door 20 to glow brightly, and the front surface of the door 20 may glow with set color by light emitted from the light source 362. In this case, the front color of the door 20 may be different color or brightness from in the state in which the lighting device 36 is turned off.

That is, a color of the front surface of the door 20 may be seen as a color of the front plate 31, and the texture and pattern disposed on the front plate 31 may be seen. In this case, the color of the front plate 31 may be color with a brightness greater than 0 and may be formed in a color other than black. The color of the front surface of the door 20 in a state in which the lighting device 36 is turned off may also be referred to as a background color.

Thus, the front surface of the door 20 may be seen with color of the front plate 31, and in this case, components inside the panel assembly 30 may be seen through the front plate 31 and may not be seen to the outside by the color of the front plate 31.

In this state, the lighting device 36 may be turned on, and, when the lighting device 36 is turned on, the front surface of the door 20 glows with the color set by the controller 13.

The front surface of the door 20 may be controlled to glow with a first color different from the background color, and the lighting device 36 may control the light source 362 such that the door 20 glows with the first color according to the control of the controller 13.

At this time, a color of light irradiated from the light source 362 may be different from the first color. That is, since the front plate 31 includes the background color, if the light with the first color is irradiated from the light source 362, the color of the light interacts with the background color when passing through the front plate 31 and thus the door 20 may actually glow with a third color.

Accordingly, in the present embodiment, control of the light source 362 to allow the door 20 to glow with a specific color may mean control of color emitted from the light source 362 in consideration of the color itself of the front plate 31.

That is, in the state in which the light source 362 is turned on, color with which the door 20 glows may be color formed by mixing color itself of the front plate 31 and color of light emitted from the light source 362.

Therefore, when the light source 362 actually emits light with the second color, it is mixed with the color itself of the front plate 31, and the front plate 31 may glow with the first color.

Some of the plurality of doors 20 forming the front appearance of the refrigerator 1 may emit light or the plurality of doors 20 may independently emit light to form the front appearance of the refrigerator 1 with set color.

The refrigerator 1 may be operated to cause some doors 20 of a plurality of doors to glow or glow with specific color. That is, all the lighting devices 36 included in the doors 20 may not be operated, but instead, only some of all the doors 20 may glow. For example, any one door 201a of the refrigerating compartment door 201 may glow.

As necessary, the left refrigerating compartment door 201a and the right refrigerating compartment door 201b may glow with different colors. At least two of the doors 20 may be sequentially changed in color and at least two of the doors 20 may be sequentially turned on or off.

In this case, the lighting device 36 included in the panel assembly 30 may be controlled by the controller 13 according to the aforementioned various conditions.

The refrigerating compartment door or the freezing compartment door among the doors may be controlled to glow with different colors.

The controller 13 may control the lighting device 36 to cause one pair of the refrigerating compartment doors 201 to be seen with the first color. The controller 13 may control the lighting device 36 to cause one pair of the refrigerating compartment doors 201 to be seen with the second color.

In addition, with respect to operation control of the lighting device 36 described below, the present disclosure is not limited to the configuration of the panel assembly or the door described above. That is, at least one of a plurality of components configuring the panel assembly may be omitted, at least one of a plurality of components may be replaced with another component, or the location of at least one component among a plurality of components may be changed.

In the present specification, a state change of the light source 362 may include one or more of a case in which the light source 362 is changed from an off state to an on state, a case in which the light source 362 is changed from an on state to an off state, a case in which one or more LEDs are turned on in a state in which the light source 362 is turned off, a case in which the light source 362 is turned off in a state in which one or more LEDs are turned on, a case in which brightness of light emitted from the light source 362 is changed in a state in which the light source 362 is turned on, a case in which the brightness or color of light emitted from some of a plurality of LEDs is changed in a state in which the light source 362 is turned on, the number of LED lights is changed (an increase in the number of LED lights or a decrease in the number of LED lights), and a case in which color of light emitted from the light source 362 is changed in a state in which the light source 362 is turned on.

The state in which the light source 362 is turned on may mean a state in which all of a plurality of LEDs are turned on, and the state in which the light source 362 is turned off may mean a state in which all of the plurality of LEDs are turned off.

Figure 10:
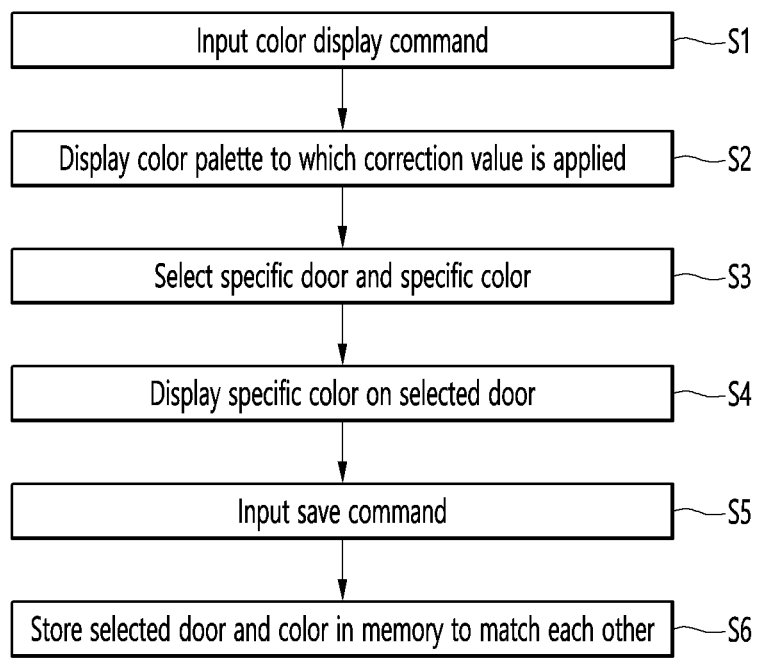
FIG. 10 is a view illustrating a first method of selecting a color with which a refrigerator door glows according to the present disclosure.
Figure 11:
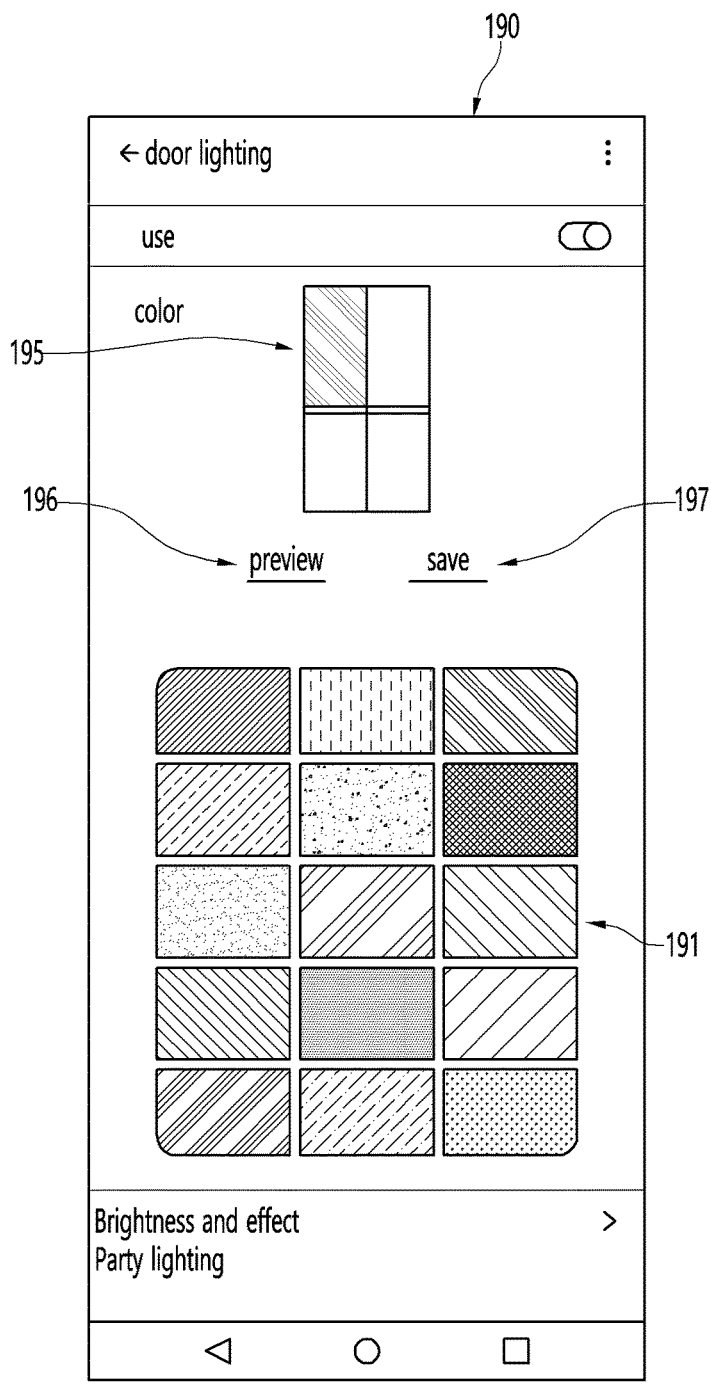
FIG. 11 is a view showing a screen displayed on a display of a home appliance.
Figure 11:
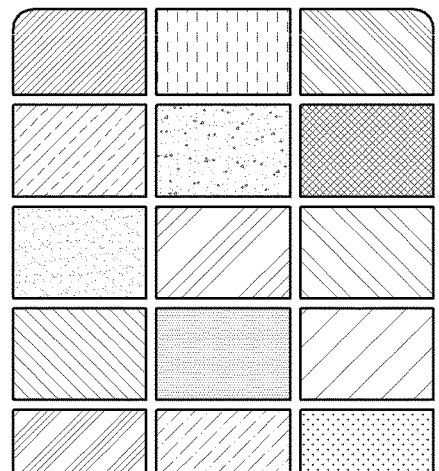
Figure 11:
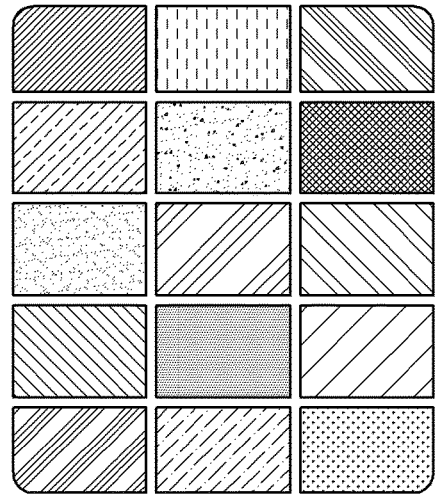

FIG. 10 is a view illustrating a first method of selecting a color with which a refrigerator door glows according to the present disclosure, and FIG. 11 is a view showing a screen displayed on a display of a home appliance.

In FIG. 11, it should be noted that a color varies by differences in the thickness, size, and shape of lines or dots within an area displaying each color of a color palette.

Referring to FIGS. 10 and 11, when a specific event occurs, the light source 362 may operate. When the light source 362 operates, the front surface of the refrigerator door may glow with a specific color.

In the present embodiment, when the specific event occurs, the user may select a specific color with which the refrigerator door glows. That is, the color with which the refrigerator door glows may vary according to the specific event.

Information on the color when the light source 362 operates according to the specific event may be stored in a non-transitory memory 18. The color information of the light source such as an R value, a G value and a B value may be stored.

In the present embodiment, the user may directly select a color of a refrigerator which is an example of a home appliance.

For example, the user may input a color display command through the display 19 (S1).

When the color display command is input, a screen 190 for selecting a color may be displayed on the display 19, as shown in (a) of FIG. 11.

A color palette 191 or a color wheel may be displayed on the screen 190.

The color palette 191 may separately display a plurality of different colors. The color wheel may continuously display different colors in a circular shape.

In this disclosure, the color palette or color wheel may be collectively referred to as a color selector.

As described above, since the front plate 31 itself includes the background color, a color palette 191 to which a correction value is substantially applied or a color wheel to which a correction value is applied may be displayed on the screen 190 in consideration of the background color of the front plate 31. That is, colors to which correction values based on the light transmission characteristic of the front plate 31 are applied may be displayed on the color selector.

FIG. 11(*b*) shows the color palette 191 before applying the correction value, and FIG. 11(*c*) shows the color palette 191 after applying the correction value.

The user may check, on the screen, the color palette 191 after applying the correction value. The color of the color palette 191 after applying the correction value is a color with which the front plate 31 actually glows.

A refrigerator-shaped icon 195 (or a door selector) for selecting a door to which the selected color will be applied may be displayed on the screen 190. The icon 195 may include, for example, a plurality of doors, and the shape of the icon 195 may be changed. That is, since the appearance of the refrigerator may be different, the user may change the shape of the icon 195 to match the shape of the icon 25 with that of the actual refrigerator.

The user may select a desired color (first color) from the color palette 191 or the color wheel displayed on the screen 190. The user may select a specific door on the icon 195 displayed on the screen 190 (S3). The selected color (first color) may be displayed on the door selected on the icon 195.

A preview button 196 and a save button 197 may be displayed on the screen 190. In order to confirm that the refrigerator door actually glows with the selected color, the user may select the preview button 196.

When the preview button 196 is selected, the controller 13 may control the light source 362 so that the selected door glows with the selected color (S4).

At this time, one or more of the R value, G value, and B value of the selected first color may be different from one or more of the R value, G value, and B value of the color (second color) actually irradiated by the light source 362. A difference between the two colors may correspond to a correction value to which the background color of the front plate 31 is applied.

In the memory 18, the color of light emitted from the light source matching a color selected by a user may be stored in advance.

Accordingly, the controller 13 may control the light source 362 based on the R value, G value, and B value corresponding to the color of light emitted from the light source stored in the memory. At this time, the light source 362 may be turned off after being turned on for a set time.

The user may select the save button 197 to save the selected color (save command selection) (S5).

Then, the color of the light source operating when the specific event occurs and door information may be stored in the memory 18 to match each other (S6).

In this case, when a specific event occurs later, the light source 362 may be controlled so that the door glows with the updated color stored in the memory 18.

As another example, an R correction value, a G correction value and a B correction value are stored in the memory 18.

When a user selects, for example, a first color through the color palette 191, the color of light emitted from the light source may be determined to be a second color to which the R correction value, the G correction value, and the B correction value are applied.

In this embodiment, the background color of the front plate of each of the plurality of doors may be the same or different, and, when the background color of the front plate is different, a different correction value may be applied to each door.

That is, the light source of the first door may be set to irradiate light with a second color so that the front plate of the first door glows with the first color, whereas the light source of the second door may be set to irradiate light with a third color so that the front plate of the second door glows with the first color.

Hereinafter, a method of determining the correction value will be described.

Figure 12:
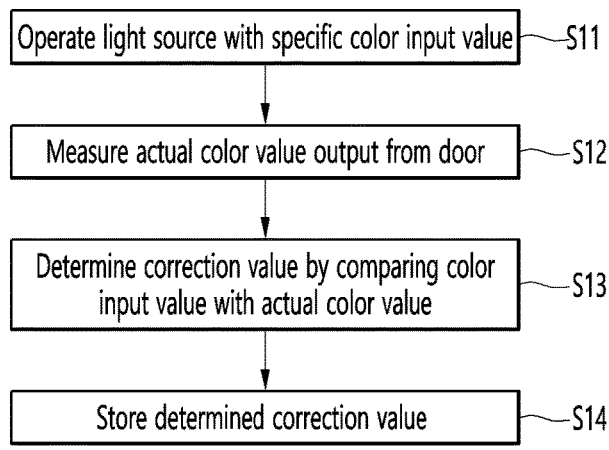
FIG. 12 is a view illustrating a method of determining a difference value between a color with which a door glows and a color of a light source as a correction value.

FIG. 12 is a view illustrating a method of determining a difference value between a color with which a door glows and a color of a light source as a correction value.

Referring to FIG. 12, the controller 13 may control the light source 362 to operate with a specific color input value (S11). The specific color input value may have a unique R value, G value and B value.

When the light source 362 operates, the light emitted from the light source 362 may shine on the front plate 31. The color of light actually shining on the front plate 31 may be different from the selected color.

A color value of light shining on the front plate 31 may be measured through a measuring tool such as a sensor or a camera (S12). That is, the R value, G value, and B value of the light shining on the front plate 31 may be measured.

Then, the R correction value, the G value, and the B correction value may be obtained by comparing the input R value, G value, and B value with the measured R value, G value, and B value (S13).

A plurality of correction values may be obtained by comparing characteristic values and measured values of a plurality of colors using the same method. Through the obtained correction values, equations for correcting each of R, G, and B may be obtained.

Then, the finally obtained correction value (or equation) may be stored in the memory 18 (S14).

Figure 13:
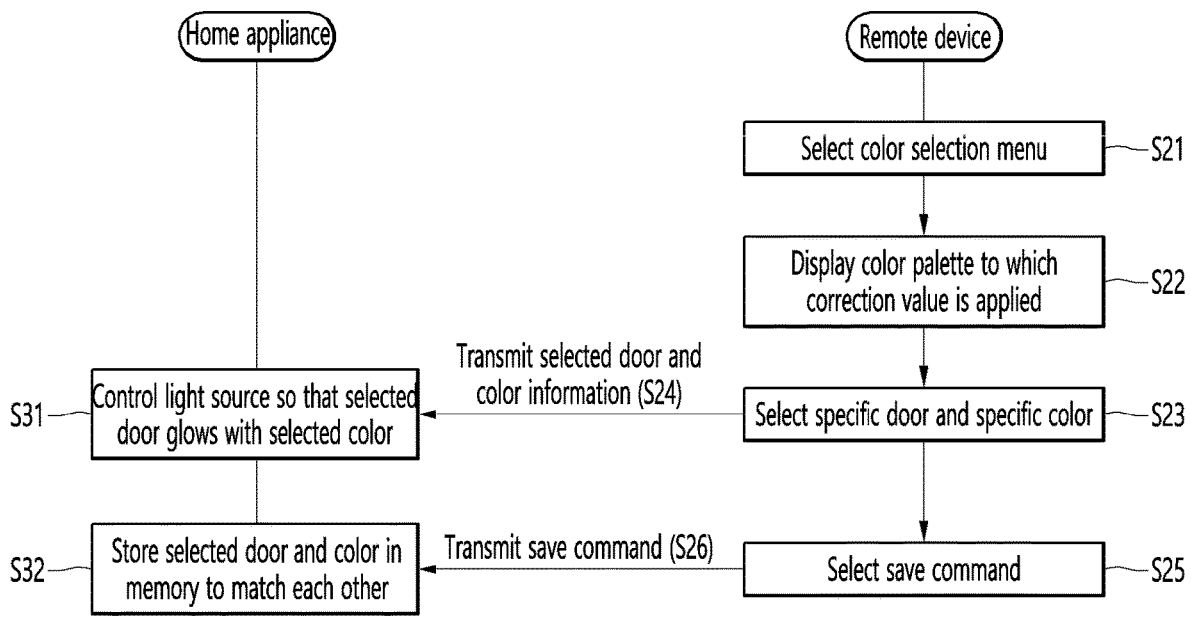
FIG. 13 is a view illustrating a second method of selecting a color with which a refrigerator door glows according to the present disclosure.
Figure 14:
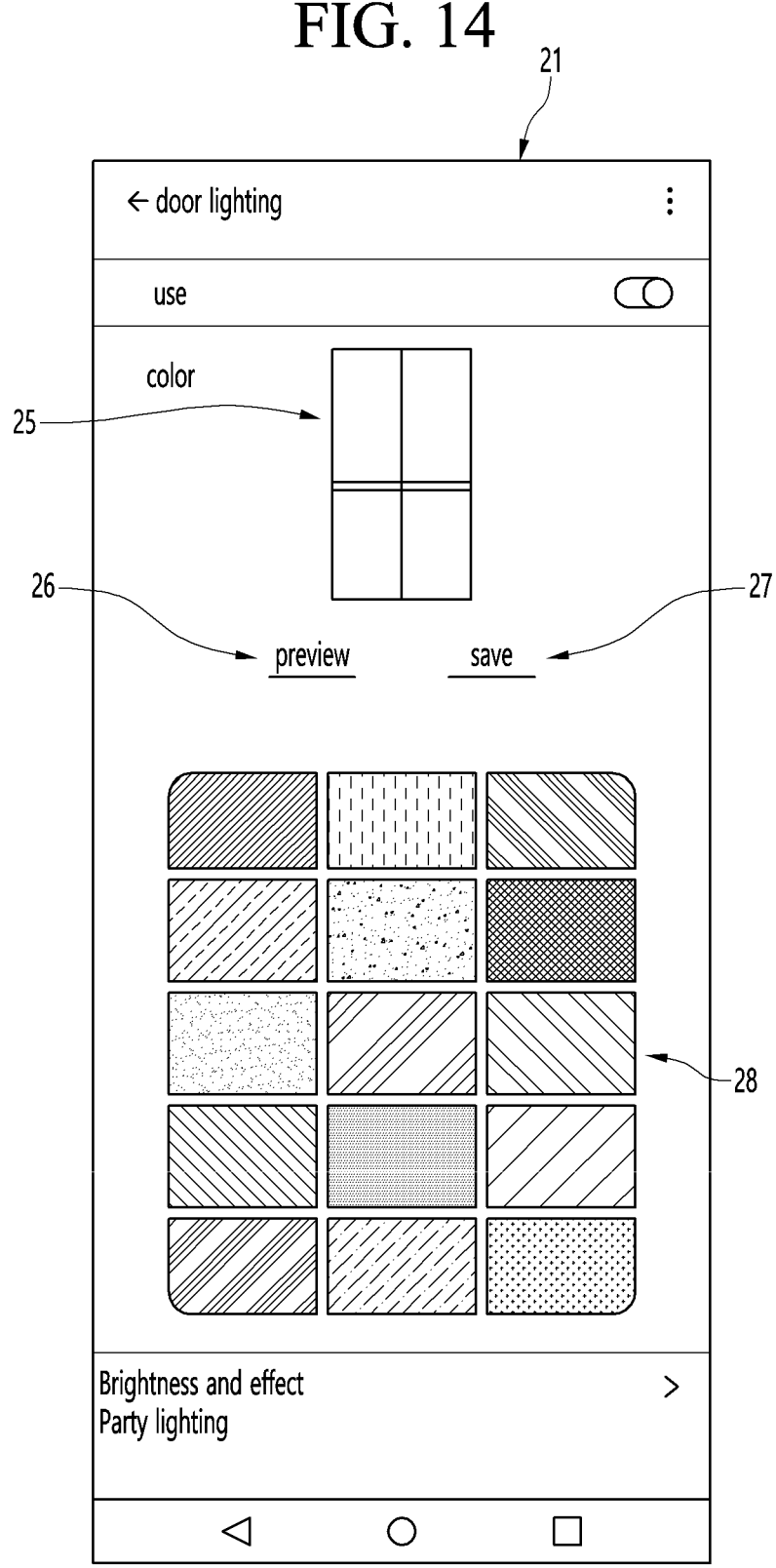
FIG. 14 is a view showing a screen displayed on a display of remote device.

FIG. 13 is a view illustrating a second method of selecting a color with which a refrigerator door glows according to the present disclosure, and FIG. 14 is a view showing a screen displayed on a display of remote device.

In FIG. 14, it should be noted that a color varies by differences in the thickness, size, and shape of lines or dots within an area displaying each color of a color palette.

Referring to FIGS. 13 and 14, a color selection menu may be selected in the remote device 2 (S21). When the color selection menu is selected, a screen 21 for selecting a specific color may be displayed on the display of the remote device 2.

As described with reference to FIG. 11, on the screen 21, a color palette 28 to which the correction value is applied or a color wheel to which the correction value is applied may be displayed (S22). The color palette 28 may separately display a plurality of different colors. The color wheel may continuously display different colors in a circular shape.

An icon 25 having a shape of a refrigerator for selecting a door to which the selected color will be applied may be displayed on the screen 21. The icon 25 may include, for example, a plurality of doors, and the shape of the icon 25 may be changed. That is, since the appearance of the refrigerator may be different, the user may change the shape of the icon 25 to match the shapes of the actual refrigerator and the icon 25.

The user may select a desired color from the color palette 28 or color wheel displayed on the screen 21 and select a specific refrigerator door from the icon 25 (S23). The selected color may be displayed on the door selected on the icon 25.

A preview button 26 and a save button 27 may be displayed on the screen 21. In order to confirm that the refrigerator door glows with the selected color, the user may select the preview button 26.

When the preview button 26 is selected, the remote device 2 may transmit information on the selected color and information on the selected door to the refrigerator 1 (S24). For example, the color information may include values for each of R, G, and B.

As described in FIG. 11, one or more of the R value, G value and B value of the first color selected from the color palette 28 may be different from one or more of the R value, G value, and B value of the color (second color) actually irradiated by the light source 362.

The information on the selected color includes the R value, G value, and B value of the second color to which correction values other than the R value, G value, and B value of the first color are applied.

When the refrigerator 1 receives color information and door information, the controller 13 may control the light source 362 so that the selected door glows with the selected color (S31).

That is, the controller 13 may control the light source 362 based on the received R value, G value, and B value. At this time, the light source 362 may be turned off after being turned on for a set time.

The user may select the save button 27 (save command selection) to save the selected color (S25).

Then, the remote device 2 transmits the save command to the refrigerator 1 (S26), and the controller 13 may store the received color information (the R value, G value and B value of the light source) in the memory 18 (S32) (color update).

In this case, when a specific event occurs later, the light source 362 may be controlled so that the door glows with the updated color stored in the memory 18.

As another example, correction values are stored in the memory 18, and, when a first color is selected by the remote device and R value, G value, and B value of the first color are received, the controller 13 may apply the correction values stored in the memory 18 and store them in the memory 18 as the R, G, and B values of the second color.

Figure 15:
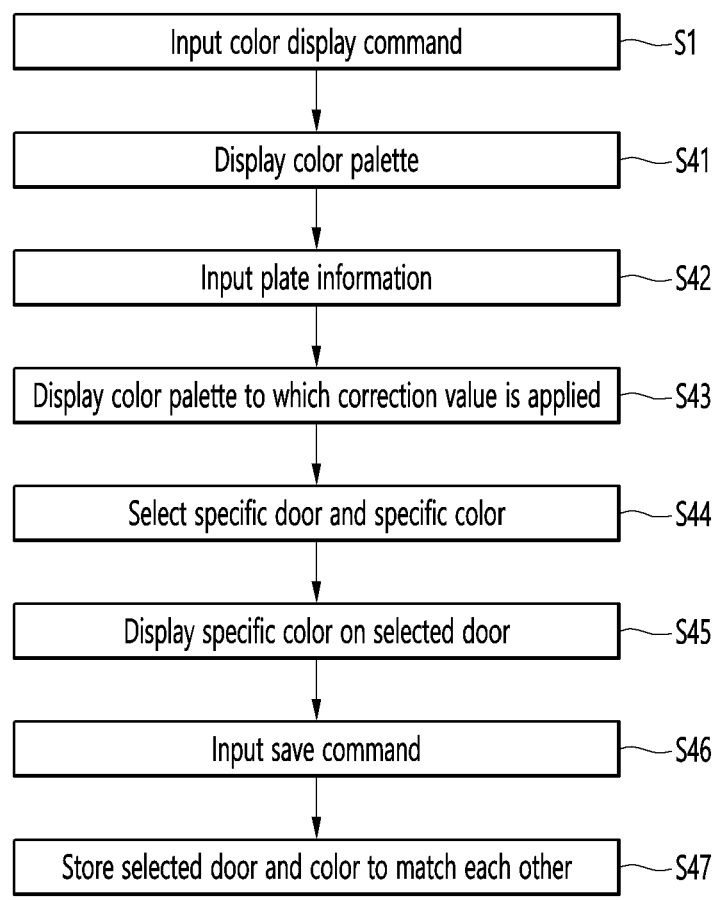
FIG. 15 is a view illustrating a third method of selecting a color with which a refrigerator door glows according to the present disclosure.

FIG. 15 is a view illustrating a third method of selecting a color with which a refrigerator door glows according to the present disclosure.

Referring to FIG. 15, a color display command may be input through the refrigerator 1 or the remote device 2 (S1).

When the color display command is input, a color palette or color wheel may be displayed on the screen of the display 19 of the refrigerator 1 or the display of the remote device 2 (S41).

The color palette or color wheel displayed on the screen is a color palette or color wheel to which correction values are not applied.

An input window for inputting plate information may be activated on the screen. The front plate 31 itself includes a unique number, and specific characteristic (for example, background color) of the front plate 31 may match each unique number.

Accordingly, plate information may be input in the input window (S42).

When plate information is input on the screen, a color palette or a color wheel to which correction values are applied may be displayed based on the input information (S43).

That is, a correction value may vary according to plate type, and a correction value corresponding to input plate information may be determined.

On the screen, a specific color may be selected through a color palette to which correction values are applied or a color wheel to which correction values are applied, and a specific door may be selected (S44).

Then, the controller 13 may control the light source 362 so that the selected door glows with the selected color (S45).

A save button may be selected on the screen (save command input) (S46), and, when the save button is selected, the color of the light source operating when a specific event occurs and door information are stored in the memory 18 to match each other. (S47).

Figure 16:
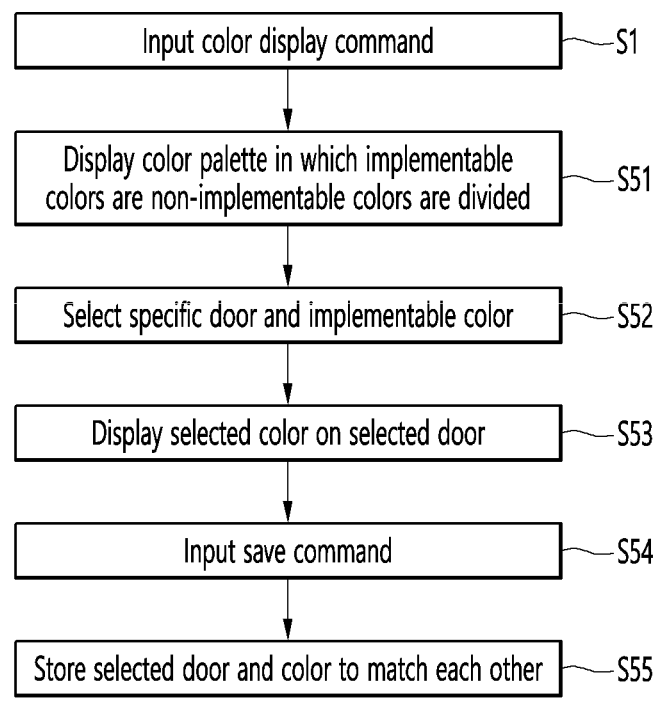
FIG. 16 is a view illustrating a fourth method of selecting a color with which a refrigerator door glows according to the present disclosure.

FIG. 16 is a view illustrating a fourth method of selecting a color with which a refrigerator door glows according to the present disclosure.

Referring to FIG. 16, a color display command may be input through the refrigerator 1 or the remote device 2 (S1).

When the color display command is input, a color palette or color wheel may be displayed on the screen of the display 19 of the refrigerator 1 or the display of the remote device 2 (S51).

At this time, a color palette (or color wheel) in which implementable colors and non-implementable colors are divided may be displayed on the screen.

Depending on the material or background color of the front plate, there may be colors that cannot be implemented when the light source 362 operates.

When a non-implementable color is displayed in the color palette and the user selects the non-implementable color, the front plate may not actually glow with the color selected by the light irradiation of the light source 362, so that the user may recognize failure or operation error.

Accordingly, in the present embodiment, a color palette (or color wheel) in which implementable colors and non-implementable colors are divided is displayed on the screen.

Alternatively, it is also possible to display only the implementable colors on the screen. Depending on the background color of the front plate, the implementable colors may vary.

In this case, the implementable color may be set to be selectable by the user, and the non-implementable color may be set to be non-selectable by the user. Also, information indicating the implementable colors may be separately displayed on the screen.

The implementable color is a color to which a correction value is applied.

Alternatively, when the user selects a non-implementable color, information indicating the implementable color may be displayed.

The user may select any one color of the implementable colors on the screen and select a specific door (S52).

Then, the controller 13 may control the light source 362 so that the selected door glows with the selected color (S53).

A save button may be selected on the screen (save command input) (S54), and, when the save button is selected, the color of the light source operating when a specific event occur and door information are stored in the memory 18 to match each other (S55).

This embodiment may further include the following additional embodiments.

First, when the front plate 31 grows with a specific color by the operation of the light source 362, the color actually felt by the user may vary according to the illuminance of a place where the home appliance is located.

For example, when the front plate 31 is set to glow with a first color, the user may confirm a second color in which one or more of the R value, G value, and B value of the first color is different, according to the illuminance of the place where the home appliance is located.

Therefore, the illuminance value sensed by the illuminance sensor of the home appliance may be additionally applied to the correction value.

That is, the correction value described above may be a correction value to which a first correction value considering the background color of the front plate 31 and a second correction value considering the illuminance value detected by the illuminance sensor are comprehensively applied.

For example, as described in FIG. 10, in step S2, the color palette to which the correction value is applied may be a correction value to which the background color of the front plate 31 and the illuminance value detected by the illuminance sensor are applied.

For example, when the illuminance value is a first illuminance value, the first color in the corrected color palette may have an R value, a G value, and a B value.

At this time, any one of the R value, G value, and B value of the first color when the illuminance value is a second illuminance value lower than the first illuminance value may be less than any one of the R value, G value, and B value of the first color when the illuminance value is the first illuminance value.

The memory 18 stores a reference color palette at the first illuminance value, and a changed color palette to which the illuminance value is applied in the reference color palette may be displayed on the screen according to the illuminance value.

When the home appliance includes an illuminance sensor, the illuminance detected by the illuminance sensor may be applied in each color selection process.

On the other hand, as the operation time of the LED constituting the light source 362 increases, reference brightness may decrease. That is, when the LED operates for a long time, the actual brightness of the LED may decrease.

The operation time of the LED may be accumulated and stored in the memory 18. Based on the cumulative operation time of the LED, when the light source 362 operates, one or more of the R value, G value, and B value of the LED may be corrected or the current value supplied to the LED may be increased by applying the degree of deterioration.

For example, when the cumulative operation time of the LED is increased compared to the reference operation time, at least one of R value, G value or B value of the LED may be increased. According to this embodiment, even if the LED is used for a long time, there is an advantage in that the color which may be checked by on the door may be constant without change.

According to the present disclosure, when a specific event occurs, it is possible to change the color of the door to a desired color of the user.

According to the present disclosure, the front plate of the door may glow with the same color as the color selected by the user, by controlling the color of the light emitted from the light source in consideration of the color of the front plate of the door.

According to the present disclosure, even if the color of the front plate of the door varies according to devices, the door may glow with the same color as the color selected by the user.

According to the present disclosure, by applying the illuminance value of the space where the home appliance is located in a color selection process, the door may glow with the color selected by the user regardless of the location of the home appliance.

What is claimed is:

1. An appliance comprising:
   a cabinet that defines a storage space; and
   a door configured to open and close at least a portion of the storage space,
   wherein the door comprises:
     a lighting device comprising a light source, and
     a front plate that defines a front appearance of the door and is configured to transmit light irradiated from the light source, the front plate being configured to, based on a first color being selected through a color selector, glow in the first color by a light transmission characteristic of the front plate based on the light source irradiating the light with a second color different from the first color, and
   wherein the color selector is configured to display a plurality of colors to be selected based on applying, to the plurality of colors, a correction value corresponding to the light transmission characteristic of the front plate.

2. The appliance of claim 1, further comprising:
   a controller configured to control the light source,
   wherein the controller is configured to, based on the first color being selected through the color selector, control the light source to irradiate light with the second color, and
   wherein at least one of a red (R) value, a green (G) value, or a blue (B) value of the first color is different from an R value, a G value, or a B value of the second color, respectively.

3. The appliance of claim 2, further comprising a display disposed at a front surface of the door and configured to display the color selector.

4. The appliance of claim 1, wherein the light transmission characteristic is defined by a background color of the front plate.

5. The appliance of claim 4, wherein the background color has a brightness greater than zero and is a color other than black.

6. The appliance of claim 4, further comprising:
   a film that is attached to the front plate and includes a printed pattern having the background color; or
   a coating or deposition layer disposed on the front plate, the coating or deposition layer having the background color and texture.

7. The appliance of claim 1, wherein the light transmission characteristic is defined by a surface treatment including at least one of imprinting, etching, or glass printing performed on the front plate.

8. The appliance of claim 1, wherein the light source is configured to irradiate the light in the second color based on applying an R correction value, a G correction value, and a B correction value to an input R value, an input G value, and an input B value, respectively, and
   wherein the R correction value, the G correction value, and the B correction value are determined by comparing the input R value, the input G value, and the input B value to a measured R value, a measured G value, and a measured B value of the first color that are measured by a measurement tool.

9. The appliance of claim 8, wherein the measurement tool comprises a sensor or a camera.

10. The appliance of claim 3, wherein the door is one of a plurality of doors, and
    wherein the display is configured to display a door selector configured to allow one or more doors to be selected among the plurality of doors to apply the color selected by the color selector.

11. The appliance of claim 10, further comprising a non-transitory memory configured to store information that includes a plurality of correction values corresponding to the plurality of doors, respectively, to thereby apply one or more of the plurality of correction values to the light source based on a door among the plurality of doors being selected by the door selector and a color of the selected door being selected by the color selector,
wherein the plurality of correction values include one or more of an R value, a G value, and a B value that are configured to enable the front plate of the selected door to glow in the selected color.

12. The appliance of claim 3, wherein the display is configured to, based on receiving, on the display, input information regarding the front plate, display one of a plurality of color selectors that matches the input information.

13. An appliance comprising:
a cabinet that defines a storage space;
a door configured to open and close at least a portion of the storage space; and
a display configured to display a color selector,
wherein the door comprises:
a lighting device comprising a light source, and
a front plate that defines a front appearance of the door and is configured to transmit light irradiated from the light source, the front plate being configured to, based on a first color being selected through the color selector, glow in the first color by a light transmission characteristic of the front plate based on the light source irradiating the light with a second color different from the first color,
wherein the display is configured to, based on receiving, on the display, input information regarding the front plate, display one of a plurality of color selectors that matches the input information, and
wherein the display is configured to apply a correction value to the one of the plurality of color selectors, the correction value being determined based on the light transmission characteristic corresponding to the input information.

14. The appliance of claim 1, further comprising a communication interface configured to communicate with a remote device,
wherein the front plate is configured to:
glow in the first color based on the first color being selected through a display of the remote device, and
change to a third color based on a selection of the third color through the display of the remote device.

15. The appliance of claim 14, further comprising a non-transitory memory configured to store a red (R) value, a green (G) value, and a blue (B) value of the first color that are received from the remote device based on the first color being selected through the display of the remote device,
wherein at least one of an R value, a G value, or a B value of the second color is different from the received R value, the received G value, or the received B value of the first color, respectively.

16. The appliance of claim 14, further comprising:
a controller configured to control the light source; and
a non-transitory memory configured to store the correction value,
wherein the controller is configured to:
based on the first color being selected through the display of the remote device, receive a red (R) value, a green (G) value, and a blue (B) value of the first color from the remote device,
apply the correction value to at least one of the received R value, the received G value, or the received B value of the first color to thereby determine the R value, the G value, and the B value of the second color, and
store the determined R value, the determined G value, and the determined B value of the second color in the non-transitory memory.

17. An appliance comprising:
a cabinet that defines a storage space; and
a door configured to open and close at least a portion of the storage space,
wherein the door comprises:
a lighting device comprising a light source, and
a front plate that defines a front appearance of the door and is configured to transmit light irradiated from the light source, the front plate being configured to glow in a first color based on the light source irradiating the light with a second color different from the first color,
wherein the appliance further comprises:
a display configured to enable selection of a color of the front plate, and
an illuminance sensor, and
wherein the display is configured to display a color selector and to apply a correction value to the color selector, the correction value being determined based on a light transmission characteristic of the front plate and an illuminance value detected by the illuminance sensor.

18. The appliance of claim 17, wherein the front plate is configured to:
based on the illuminance value corresponding to a first illuminance value, glow in the first color having a first red (R) value, a first green (G) value, and a first blue (B) value; and
based on the illuminance value corresponding to a second illuminance value greater than the first illuminance value, glow in the first color having a second R value, a second G value, and a second B value, and
wherein at least one of the second R value, the second G value, or the second B value is greater than the first R value, the first G value, or the first B value, respectively.

19. The appliance of claim 1, further comprising:
a non-transitory memory configured to store information including a cumulative operation time of the light source,
wherein the light source is configured to, based on the cumulative operation time of the light source exceeding a reference time, (i) irradiate light having at least one of a red (R) value, a green (G) value, or a blue (B) value that is increased from a reference RGB value, or (ii) receive a current value that is increased from a reference current value.

20. The appliance of claim 1, wherein the door is one of a plurality of doors, the plurality of doors comprising:
a first door that comprises a first light source and a first front plate, the first front plate having a first light transmission characteristic; and
a second door that comprises a second light source and a second front plate, the second front plate having a second light transmission characteristic, wherein the first light source is configured to irradiate light with the second color to thereby enable the first front plate to glow in the first color, and wherein the second light source is configured to irradiate light with a third color to thereby enable the second front plate to glow in the first color.

21. The appliance of claim 1, wherein the door is one of a plurality of doors, the plurality of doors comprising:

a first door that comprises a first light source and a first front plate, the first front plate having a first light transmission characteristic and being configured to, based on transmitting light irradiated from the first light source with the second color, glow in the first color different from the second color; and a second door that comprises a second light source and a second front plate, the second front plate having a second light transmission characteristic and being configured to, based on transmitting light irradiated from the second light source with the second color, glow in a third color different from the second color.

22. The appliance of claim 13, further comprising a controller configured to control the light source, wherein the controller is configured to, based on the first color being selected through the color selector, control the light source to irradiate light with the second color, and wherein at least one of a red (R) value, a green (G) value, or a blue (B) value of the first color is different from an R value, a G value, or a B value of the second color, respectively.

* * * * *